United States Patent
Nolting et al.

(10) Patent No.: US 6,411,681 B1
(45) Date of Patent: Jun. 25, 2002

(54) TRAFFIC TRACK MEASUREMENTS FOR ANALYSIS OF NETWORK TROUBLES

(75) Inventors: Thomas A. Nolting, Holliston; Richard LaPearl, Princeton; Karen Dion, Dudley; Raymond Gillis, Melrose; Carol Snow, Northbridge, all of MA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/189,082

(22) Filed: Nov. 10, 1998

Related U.S. Application Data

(63) Continuation-in-part of application No. 09/048,102, filed on Mar. 26, 1998.

(51) Int. Cl.[7] .............................................. H04M 15/00
(52) U.S. Cl. ........................ 379/34; 379/112; 379/114; 379/133; 379/116
(58) Field of Search ........................ 379/34, 133, 134, 379/137, 139, 112, 113, 114, 115, 116

(56) References Cited

U.S. PATENT DOCUMENTS

| | | | |
|---|---|---|---|
| 4,456,788 A | | 6/1984 | Kline et al. |
| 4,464,543 A | * | 8/1984 | Kline et al. .................... 379/34 |
| 4,760,594 A | | 7/1988 | Reed |
| 4,788,718 A | | 11/1988 | McNabb et al. |
| 5,008,929 A | | 4/1991 | Olsen et al. |
| 5,285,494 A | | 2/1994 | Sprecher et al. ............... 379/59 |
| 5,333,183 A | | 7/1994 | Herbert ....................... 379/112 |
| 5,359,649 A | | 10/1994 | Rosu et al. ................... 379/220 |
| 5,425,087 A | | 6/1995 | Gerber et al. |
| 5,434,845 A | * | 7/1995 | Miller .......................... 370/13 |

(List continued on next page.)

OTHER PUBLICATIONS

"Gentia Software, Section 3: Query and Reporting Tools", by META Group, Inc., *Data Warehousing Tools Bulletin* (Aug. 1997); pp, 3615–3620.

Hewlett Packard 1991 "Test & Measurement Catalog", entitled "Data Communications Test Equipment", p. 567.

Hewlett Packard Brochure entitled "Unlock the secrets of Signaling System No. 7 –fast", HP 37900B and 37900C Signaling Test Sets.

Hewlett Packard Brochure entitled "GSM Signaling Test System", HP 37900 Product Note–1.

(List continued on next page.)

*Primary Examiner*—Curtis Kuntz
*Assistant Examiner*—Quoc D. Tran
(74) *Attorney, Agent, or Firm*—Radar, Fishman & Grauer PLLC

(57) ABSTRACT

A monitoring system captures and processes messages from SS7 links, to compile call detail records (CDRs) for all interoffice call attempts. The CDRs are uploaded into a relational database. A data preparation operation utilizes external information to enhance the records for further processing, for example, to translate release cause codes in the records to textual indications of reasons for the releases. The enhanced records are loaded into a multi-dimensional database. The multi-dimensional database software facilitates analysis of the records to identify a variety of network traffic patterns and related troubles. In particular, the processing of the enhanced CDR data can provide a variety of analytical tools and reports, using the release cause codes. For example, the analysis can indicate the number of calls to a destination that did not get through and identify by major categories the principle reasons that calls did not go through, e.g. user busy, no trunk available, etc. The analysis also can identify the element that generated the cause of the release code. For example, if there were no trunk available through a particular tandem, as indicated by the release code, the CDRs and analytical report would identify the tandem.

26 Claims, 5 Drawing Sheets

U.S. PATENT DOCUMENTS

| | | | | |
|---|---|---|---|---|
| 5,438,570 A | * | 8/1995 | Karras et al. | 379/133 |
| 5,457,729 A | | 10/1995 | Hamann et al. | 379/2 |
| 5,483,590 A | | 1/1996 | Chiu et al. | |
| 5,563,930 A | | 10/1996 | Pester, III | |
| 5,579,371 A | | 11/1996 | Aridas et al. | 379/34 |
| 5,592,530 A | * | 1/1997 | Brockman et al. | 379/34 |
| 5,642,396 A | * | 6/1997 | Cowgill | 379/14 |
| 5,692,181 A | * | 11/1997 | Anand et al. | 395/613 |
| 5,712,908 A | | 1/1998 | Brinkman et al. | 379/119 |
| 5,715,294 A | | 2/1998 | Pester, III | |
| 5,724,584 A | | 3/1998 | Peters et al. | |
| 5,737,399 A | | 4/1998 | Witzman et al. | |
| 5,745,732 A | | 4/1998 | Pester, III | |
| 5,757,895 A | * | 5/1998 | Aridas et al. | 379/112 |
| 5,774,530 A | | 6/1998 | Montgomery et al. | |
| 5,793,839 A | | 8/1998 | Farris et al. | |
| 5,802,145 A | | 9/1998 | Farris et al. | |
| 5,809,120 A | | 9/1998 | Montgomery et al. | |
| 5,825,769 A | | 10/1998 | O'Reilly et al. | |
| 5,828,729 A | | 10/1998 | Clermont et al. | |
| 5,835,583 A | | 11/1998 | Hetz et al. | 379/220 |
| 5,838,682 A | | 11/1998 | Dekelbaum et al. | 370/401 |
| 5,838,769 A | | 11/1998 | McNeil et al. | |
| 5,838,796 A | | 11/1998 | Mittenthal | 380/28 |
| 5,844,981 A | | 12/1998 | Pitchford et al. | |
| 5,850,426 A | | 12/1998 | Watkins et al. | 379/29 |
| 5,852,819 A | * | 12/1998 | Beller | 707/1 |
| 5,854,834 A | | 12/1998 | Gottlieb et al. | 379/113 |
| 5,854,835 A | | 12/1998 | Montgomery et al. | |
| 5,864,608 A | | 1/1999 | Brownmiller et al. | 379/113 |
| 5,867,558 A | * | 2/1999 | Swanson | 379/34 |
| 5,867,565 A | | 2/1999 | Morikawa | |
| 5,875,238 A | | 2/1999 | Glitho et al. | |
| 5,881,140 A | | 3/1999 | Gerault et al. | |
| 5,896,445 A | | 4/1999 | Kay et al. | 379/135 |
| 5,901,208 A | | 5/1999 | Jabbarnezhad | |
| 5,905,785 A | | 5/1999 | Dunn et al. | 379/113 |
| 5,905,985 A | | 5/1999 | Malloy et al. | 707/100 |
| 5,907,603 A | * | 5/1999 | Gallagher et al. | 379/133 |
| 5,917,898 A | | 6/1999 | Bassa et al. | 379/133 |
| 5,933,490 A | | 8/1999 | White et al. | 379/221 |
| 5,937,042 A | | 8/1999 | Sofman | 379/113 |
| 5,940,471 A | | 8/1999 | Homayoun | 379/1 |
| 5,949,862 A | | 9/1999 | Fukuzawa et al. | 379/113 |
| 5,999,604 A | | 12/1999 | Walter | 379/133 |
| 6,011,838 A | * | 1/2000 | Cox | 379/113 |
| 6,052,447 A | | 4/2000 | Golden et al. | 379/114 |
| 6,052,448 A | * | 4/2000 | Janning | 379/114 |
| 6,067,354 A | | 5/2000 | Bauer et al. | 379/113 |
| 6,075,848 A | | 6/2000 | Lunn et al. | |
| 6,078,647 A | | 6/2000 | D'Eletto | 379/34 |
| 6,112,238 A | | 8/2000 | Boyd et al. | |
| 6,141,412 A | | 10/2000 | Smith et al. | |

OTHER PUBLICATIONS

"Can you afford to be without SS7 network surveillance?" by Rex R. Hester, Telephony, Dec. 3, 1990.

"Telecommunications", International Edition, vol. 23, No. 8, Aug. 1989.

Article entitled "Test and Measurement techniques for GSM", from Telecommunications, Dec. 1989 issue.

Hewlett Packard Brochure entitled "HP 37900A and 37900B Signaling Test Sets", Technical Data for "Get the best from Signaling System No. 7".

Hewlett Packard Brochure entitled "Wide area networking protocol analysis solutions for the long run." re HP 4954A wide area network protocol analyzer, 1987.

Article entitled "ASQIC 800 Call Data Master", published in AT&T Technical Journal, pp. 21–31, May/Jun. 1987, vol. 66, Issue 3.

Article entitled "By probing your SS7 links, you can gather all sorts of information", published in Wireless Review, May 1, 1998.

Press Release entitled "Inet Technologies Reports Record Revenues for Eleventh Consecutive Quarter" dated Jan. 25, 2001.

"Investor Relations FAQs" published by Inet Technologies, Inc. Sep. 7, 2000.

Promotional materials entitled "Network Operations & Maintenance", "IT: seven Revenue Assurance Applications", "Diagnostics", and "IP/SS7 Interoperability" by Inet Technologies, Inc.

Promotional Brochure entitled "GeoProbe Mobile", published by Inet Technologies, Inc.

Promotional materials published by Inet Technologies, Inc. including GeoProbe Service Provider's Competitive Advantage, GeoCare, and 2 press releases.

Inet Technologies Inc. (INTI) Quarterly Report (SEC form 10–Q), dated Aug. 4, 2000.

New Release entitled AT&T to manage international gateway sites with Inet's GeoProbe system:, dated Jan. 26, 1998.

* cited by examiner

TRAFFIC TRACK MEASUREMENTS FOR ANALYSIS OF NETWORK TROUBLES

Cross-Reference to Related Application

This application is a continuation-in-part of U.S. patent application Ser. No. 09/048,102 filed on Mar. 26, 1998 entitled NETWORK PLANNING TRAFFIC MEASUREMENT PROGRAM, the disclosure of which is entirely incorporated herein by reference.

TECHNICAL FIELD

The present invention relates to methods and systems for accumulating call specific data for network communication traffic, including release cause information, and analyzing network troubles as well as traffic patterns encountering troubles, based on the call data.

ACRONYMS

The written description uses a large number of acronyms to refer to various services, messages and system components. Although generally known, use of several of these acronyms is not strictly standardized in the art. For purposes of this discussion, acronyms therefore will be defined as follows:
Automatic Message Accounting (AMA)
Address Complete Message (ACM)
ANswer Message (ANM)
Call Detail Record (CDR)
Carrier Identification Code (CIC)
Centi-Call Seconds (CCS)
Central Office (CO)
Competitive Local Exchange Carrier (CLEC)
Common Channel Interoffice Signaling (CCIS)
Common Language Location Identifier (CLLI)
Customer Record Information System (CRIS)
Destination Point Code (DPC)
End Office (EO)
Engineering and Administrative Data Acquisition System (EADAS)
Global Title Translation (GTT)
IDentification (ID)
Initial Address Message (IAM)
Interexchange Carrier (IXC)
Integrated Services Digital Network (ISDN)
Internet Service Provider (ISP)
ISDN User Part (ISDN-UP or ISUP)
Landing Zone (LZ)
Line Identification Database (LIDB)
Local Area Network (LAN)
Local Exchange Carrier (LEC)
Loop Maintenance Operations Systems (LMOS)
Message Signaling Unit (MSU)
Message Transfer Part (MTP)
Minutes Of Use (MOU)
Multi-Dimensional DataBase (MDDB)
Number-Plan-Area (NPA)
On-Line Analytical Processing (OLAP)
Operations, Maintenance, Application Part (OMAP)
Origination Point Code (OPC)
Personal Computer (PC)
Plain Old Telephone Service (POTS)
Public Switching Telephone Network (PSTN)
ReLease Complete (RLC) message
RELease (REL) message
Service Switching Point (SSP)
Signaling Link selection Code (SLC)
Signaling System 7 (SS7)
Signaling Point (SP)
Signaling Transfer Point (STP)
SubSystem Number (SSN)
SUSpend (SUS) message
Structured Query Language (SQL)
Transaction Capabilities Applications Part (TCAP)
Wide Area Network (WAN)

BACKGROUND ART

An essential problem in optimizing a telecommunications network is balancing equipment and trunking against service, maintenance and cost. Network design involves predicting future demand based on past results, evaluating the capacity of equipment and facilities, and providing the correct amount of capacity in the proper configuration, in time to meet service objectives. Effective operation of a network involves recognizing troubles and congestion and implementing corrective measures. Virtually every element of a telecommunications system is subject to failure or overload. Effective testing, monitoring, control, and maintenance therefore is essential to obtain and maintain acceptable levels of performance and customer satisfaction.

Rapid changes and increases in demand for telecommunication services increase the pressures for cost effective engineering, maintenance and upgrading of the telephone network. Two examples of recent concern to local exchange carriers (LECs) relate to Internet access traffic and traffic to and from competitive local exchange carriers now commonly referred to as "CLECs."

The sudden increase in popularity of access to the Internet, for example, has radically changed the loading placed on the telephone network. Normal voice telephone calls tend to occur at random times, and the network typically routes the majority of such calls to random destinations. Also, the average hold times for such calls tend to be short, e.g. three minutes. By contrast Internet traffic tends to have severe peak traffic times during any given twenty-four hour period, e.g. from 8:00PM to 11:00PM. Also, the network must route Internet access calls to a very small number of destinations, i.e. to the lines for modem pools operated by Internet Service Providers (ISPs). Instead of many parties calling each other randomly, many callers are all calling in at about the same time to a limited number of service providers. Finally, hold times for Internet calls can last for hours. Some Internet users access the Internet when they sit down at the desk and leave the call connection up until they decide to turn their computers off, e.g. at the end of their day. If they leave their computers on all the time, the connections to the ISPs may stay up for days. These Internet traffic patterns add incredibly heavy traffic loads to the telephone network and tend to concentrate those loads in specific offices providing service to the ISPs.

To meet the new demands relating to traffic to and from a competitive local exchange carrier (CLEC), the LEC must provide tandem capacity and trunking to the CLEC exchanges. The CLECs demand that the LEC provide sufficient capacity to minimize blockages on calls to and from the CLEC networks. Disputes also arise over the amount and direction of such traffic, for example, as it relates to billing and compensation issues.

Adding end offices, specialized switching modules, trunks, tandem offices and the like to meet new demands such as those of Internet access and CLEC interconnection requires considerable expense. Accurate engineering, to minimize cost and yet provide effective service to the various customers, becomes ever more essential. To provide effective engineering, it is necessary that the LEC understand the traffic involved. Such understanding requires accurate and complete traffic measurement.

In particular, it is necessary that the LEC recognize causes of network troubles interfering with large volumes of traffic. For example, if a CLEC or ISP complains of blockages, and the blockages are due to overloading of the LEC equipment servicing the CLEC or ISP, then the LEC must design and deploy an upgrade of the LEC network specifically engineered to eliminate the cause of the blockages. If the LEC equipment was not in fact the cause of the blockages, e.g. if the ISP did not subscribe to enough lines and deploy enough modems, then any upgrade deployed by the LEC would actually be a waste of considerable time, effort and expense.

Existing operations and maintenance systems concentrate on responding to specifically reported troubles relating to individual lines or network elements. For example, U.S. Pat. No. 5,687,212 to Kinser et al. discloses a reactive maintenance system that analyzes the working status of customer network facilities in response to a customer request reporting a customer trouble. An attendant station receives the trouble report from the customer, and a test system initiates testing of the line associated with the trouble report. The reactive maintenance system also includes a work request processing and dispatch system, for dispatching field technicians to resolve identified circuit problems. While such a system is effective in resolving specifically reported line troubles, this system does not provide any overall picture of the traffic and congestion related troubles, such as reasons for high numbers of blockages on calls to a particular customer.

Attempts to use traditional approaches, such as the accumulation of data from the switches themselves and the Engineering and Administrative Data Acquisition System (EADAS), fell short of providing the desired information.

For example, one approach to a traffic analysis is to study usage in an office by setting up a "busy study" with respect to specific individual lines served through that office. However, it is not possible to look at all the traffic in the office at one time. Typically, the LEC can study maybe three different lines at a time. So in a 50,000-line office the LEC engineers can examine the traffic for up to three hundred lines at one time. Also, setting up and maintaining such studies are labor intensive. To conduct a meaningful number of busy studies throughout a large service area, a LEC virtually needs an army of clerical people whose main job function is setting up busy studies. Once set up, such a busy study may run for three weeks, but at the end of that time, it takes another two weeks to process the output and organize the results into a report. Results are not available in real-time. Even when results do become available, the study only shows data on a few lines that may or may not be causing blockage in the busy hour. If the lines were not properly selected, the busy study may be virtually meaningless to the network engineer trying to relieve congestion through the office. Traffic patterns are changing rapidly, e.g. as the CLECs' customer base grows, as new ISPs obtain lines or as existing ISPs add new lines in already congested service areas. As a result, by the time that the engineer accumulates enough data for a meaningful study, the data may already be obsolete. Finally, the known network study techniques provide little or no ancillary information regarding causes of blockages of calls to the lines under study. As such, the available information relating to traffic problems affecting a high-volume customers' service is limited, at best.

U.S. Pat. No. 5,475,732 Pester describes an SS7 Network Preventative Maintenance System for detecting potential signaling system seven (SS7) and switched network troubles, automatically analyzing the troubles, and providing alarm and corrective action to avoid major network events. The Pester SS7 Real Time Monitor System described in that Patent is a multi-stage SS7 network preventative maintenance tool that traps SS7 messages, detects potential SS7 and switched network troubles, automatically analyzes those troubles, and provides alarm and corrective action instructions to maintenance personnel. This too is a reactive approach intended to detect and correct existing problems with existing network equipment. The intent is to enable immediate corrective action with respect to an element causing or experiencing a particular problem.

U.S. Pat. No. 5,592,530 to Brockman et al. relates to an SS7 monitoring system for evaluating the operations of telephone switches by capturing data between signaling nodes of a telephone switching system. The Brockman et al. surveillance equipment captures signaling information from different signaling network paths within a mated pair of signaling transfer points (STPs) and correlates the fragmented messages for each monitored call. The system is capable of generating call detail records from the SS7 messages of a mated pair cluster, for use in billing and fraud detection.

While the above discussed Pester and Brockman et al. Patents describe the usefulness of monitoring an SS7 common channel interoffice signaling network for event detection, neither of these patents is directed to the particular problems of aggregate traffic measurement addressed by the present invention. The Pester Patent places emphasis on monitoring of the SS7 network itself in order to detect troubles in its functioning. The Brockman et al. Patent focuses on monitoring of all links to the STPs in a pair and the assembly of related SS7 signaling messages to form a record of call completions.

While these methodologies may be effective for their stated purposes there remains a distinct need for an efficient and effective tool for monitoring and analyzing types of traffic through the telephone network, to recognize and analyze volumes and patterns of network traffic and troubles at a high level rather than at a specific element level. Pester, for example, envisions immediate action to correct a fault, not measurement of traffic to show or forecast growth and increases on demand for services. There is still a specific need for a traffic analysis methodology to recognize choke points and other congestion related causes of common network troubles, particularly troubles encountered by certain types of dynamic high volume customers of a local carrier, such as other carriers and ISPs. There is a need for a traffic analysis tool, particularly for use in designing network upgrades, that analyzes overall traffic through a portion of the network and analyzes troubles in relation to the overall traffic patterns.

It is accordingly an object of this invention to provide a relatively low cost solution to those problems and needs.

It is another object of the invention to provide a timely, powerful, cost effective means of analyzing volume traffic flow through the Public Switching Telephone Network (PSTN) and blockages and other troubles encountered by such traffic.

It is a further object of the invention to provide a flexible, expedient, accurate, and cost-effective method to identify traffic factors and/or specific equipment contributing to network blockages.

DISCLOSURE OF THE INVENTION

The invention addresses the above stated needs by providing effective techniques for monitoring management data messages used by a telecommunication network during processing of calls through the network. For each call, at least one message comprises an item of information relating to the cause of release of a circuit involved in the call, for example a release cause code. The invention involves compiling detailed records of processed calls from the messages, and these records include the release cause information. Processing of the records enables analysis of troubles encountered by particular types of substantial call traffic through the network, based on analysis of the release cause information.

The call records are developed from monitoring or compiling of items of information from certain management data messages used by the network. Management data here refers to information generated by the telecommunication network for its operations purposes. The invention can utilize any such messages, so long as they include release cause information. An example of such data might be messages sent from central offices of the network to an accounting office, for record keeping and billing purposes, assuming that such messages include the necessary release cause information. The preferred embodiments involve monitoring of interoffice signaling messages generated to control call set-up and tear-down. For example, the signaling system seven (SS7) protocol specifically requires a release message during teardown of each call. That message includes a release cause code.

Aspects of the invention encompass both methods and systems for accumulating the necessary call data from monitoring of the network and analysis of the call data with regard to the traffic troubles and patterns thereof.

Thus, a first aspect of the invention relates to a method that analyzes network troubles based on release cause information accumulated from monitoring of the telecommunication network. Specifically, this method involves capturing management data messages generated by the network during call processing. At least one of the management data messages generated during the processing of each call specifies a release cause. From the messages, the method compiles a detailed record of each call. Each call record includes a specified release cause. The specified release causes in the detailed records are processed in order to form aggregate data. The aggregate data indicates troubles encountered in processing of patterns of call traffic through the telecommunication network.

Examples of patterns of call traffic include calls through a particular office of the network, all calls of a particular type through one or more offices, etc. Specific patterns of interest include calls for Internet access and calls to or from a CLEC network.

The preferred embodiment of the method relates to analyzing troubles encountered by call traffic processed through a telephone network. Here, the method involves monitoring interoffice signaling messages communicated between offices of the telephone network during processing of each call. At least one of the messages communicated during the processing of each call comprises a release cause code. Detailed records for a set of calls are compiled from the monitored messages, and each of these records includes a release cause code specifying a reason that the telephone network did not complete a respective call. The inventive method involves processing the release cause codes in the detailed records, to form the aggregate data indicative of troubles preventing the telephone network from completing calls.

The analysis of release cause codes using aggregate data provides information relating to troubles encountered in high volume traffic flows and patterns of call processing through the telephone network. The analysis of release causes for uncompleted calls provides a tool for long range maintenance and upgrade planning. For example, such an analysis clearly shows locations and causes of congestion relating to certain patterns of traffic. This enables the engineer to design and deploy changes or new equipment in the network to best address the underlying cause of congestion impacting on significant types of customers and services, corresponding to the traffic patterns.

The invention emphasizes analysis of traffic and patterns for engineering, congestion relief and other purposes, as opposed to the detection of individual faults for immediate corrective action as was the case in the past.

Another aspect of the invention relates to a traffic tracking system. The system includes a monitoring system, for association with a switched telecommunication network. The monitoring system monitors management data messages communicated during processing of calls by a switched telecommunication network. At least one message generated during the processing of each call specifies a release cause. In an embodiment that monitors a telephone network, for example, at least one message regarding each call is a release message that contains a release cause code. A processor compiles detailed records of processed calls from the monitored messages. A database stores the detailed records of calls in a table. An on-line processing system aggregates data indicative of troubles encountered by call traffic processed by the switched telecommunication network from the database table.

In the preferred embodiment, the traffic tracking system also includes a data preparation routine. The database receives and stores detail records of selected calls processed through the network. The data preparation routine operates on files in the database, to enrich the detail records in a predetermined manner corresponding to a running study. The preparation routine, for example, may convert release cause codes from the detailed records to descriptions of the release causes. As another example, this routine may translate information in the records into identifications of offices processing the calls, preferably including any offices that caused releases for uncompleted calls.

The on-line analytical processing routine receives the enriched call detail records from the data preparation routine. An application, running on the on-line analytical processing routine, processes the enriched call detail records in accord with the study.

In the preferred embodiment, the on-line analytical processing program comprises a multi-dimensional database and implements a web suite type user interface, for analyzing and accessing the study results. The data preparation system uploads an expanded table containing the records with the enriched information. The data preparation system may generate one or more summary tables, for use by a particular study application running in the on-line analytical processing system.

The inventive system may provide traffic tracking for any of a variety of different types of networks. However, the preferred embodiments track traffic for trouble analysis of calls through a switched call processing network, such as a local carrier's network of the public switching telephone network. Such a network includes switching offices, providing selective call connections to links serving subscribers. Many such networks produce a variety of call management data messages for normal call processing and/or accounting, which may be monitored or accumulated for use in the traffic tracking studies of the present invention. The preferred embodiment monitors common channel interoffice signaling messages, which typically contain cause codes identifying release causes exemplifying the causes of network troubles.

In this regard, the preferred embodiments of the present invention utilize real time monitors on selected SS7 links to collect out-of-band interoffice signaling messages. A site processor compiles data from the signaling messages relating to individual calls, to form call detail records (CDRs) for all interoffice call attempts. The site processor uploads the CDRs to a central server. The server maintains the relational database for the CDRs derived from the signaling data. Data from the relational database is processed or 'prepared' and uploaded to the multi-dimensional database. The multi-dimensional database provides the on-line analytical processing tools for enhanced processing of the call data and offers an efficient graphical user interface, preferably a web suite type interface.

Data mining technologies allow for detection of subtle network conditions traceable through CDR release data. Unique release patterns point back to subtle problems in the network.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The present invention relies on monitoring of management data messages used by a telecommunication network during call processing. Management data messages can be any type of information messages generated by the telecommunication network for its operations purposes, for example, messages sent from central offices of the network to an accounting office, for record keeping and billing purposes or interoffice signaling messages. The invention involves monitoring of a particular type of such messages that includes codes representing causes of call releases, at least identifying reasons for failures to complete calls. Call detail records compiled from the messages thus identify failure causes, for example as descriptive information developed from translation of the codes.

From the detailed records of at least the failed calls, the invention provides tools to analyze traffic, with particular emphasis on analysis of the completion failures and release causes, in order to identify troubles and traffic patterns causing or experiencing high rates of blockages. The release cause codes identify the nature of blockages and other troubles, and other information in the messages often identifies network offices involved with the troubles. Analysis based on the messages therefore can identify the nature and location in the network of particular troubles.

The study of blockages and other troubles using the release cause codes from the detailed call processing records presents a number of applications. For network engineering purposes, the information regarding the types and locations of blockages enables decisions as to when and where to deploy new equipment, such as direct end offices trunks, tandems, advanced peripheral switch modules, etc. The blockage data also may be useful in marketing, for example, to show a customer the cause of his blockage problems and how and a more advanced service such might overcome those problems.

Figure 1:
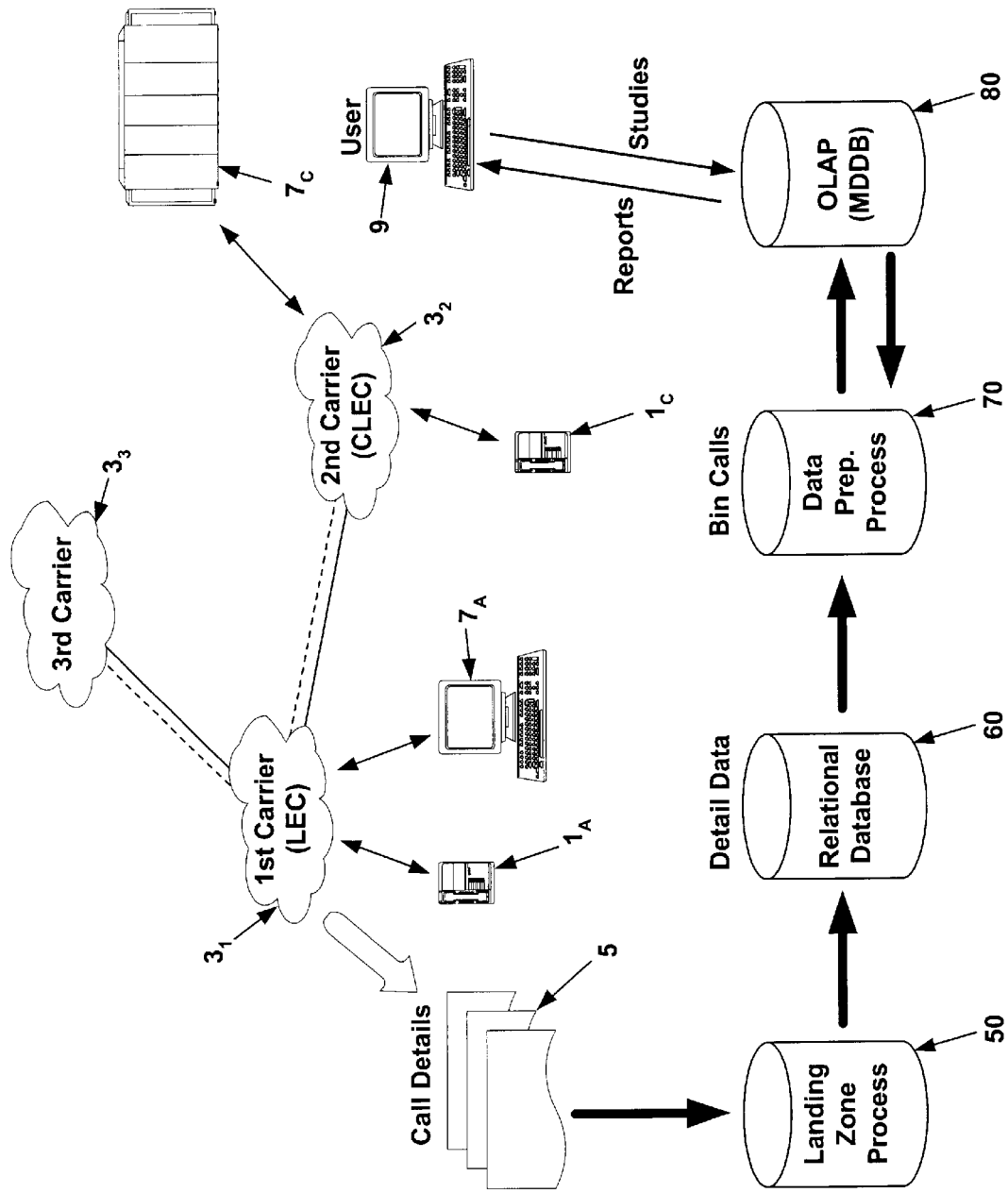
FIG. 1 is a block diagram showing the high-level functional aspects of a traffic track system for analysis of blockages and other troubles encountered by traffic through a network.

FIG. 1 provides a high-level illustration of the functions involved in the traffic studies used to analyze traffic through one or more carriers' networks, particularly to identify and analyze troubles. In reality, the public network that we think of as the telephone network comprises many segments operated by different carriers, including local exchange carriers (LECs) and interexchange carriers (IXCs). For purposes of this discussion, FIG. 1 illustrates three such segments or sub-networks.

One sub-network is a network $3_1$, operated by a LEC. The second sub-network could be that of an IXC or any other carrier, but for purposes of this discussion, FIG. 1 depicts a second network or segment $3_2$ operated by a competitive Local Exchange Carrier (CLEC). The first two networks $3_1$ and $3_2$ are interconnected by trunk links, represented collectively by a solid line, for carrying the actual traffic. The networks also are interconnected by signaling links, depicted as a dotted line.

FIG. 1 depicts a third carrier's network $3_3$. The third carrier's network connects to the LEC's network $3_1$ through trunk links (solid line) for carrying the actual traffic and through signaling links (dotted line). In a typical example, the third carrier would be an IXC or a cellular provider.

End users typically operate telephones, such as the telephones 1, to make calls through the public switching telephone network (PSTN) 3. The PSTN provides switched connections between calling and called stations, supporting voice-grade communications between the stations. The parties may use the switched voice-grade connections for conversational speech. Today, many parties also use the telephone connections through the PSTN to communicate other information, e.g. data modulated onto carrier waves within the audio bandwidth of the telephone network.

The telephone calls may stay entirely within one carrier's network, for example when a party using PC $7_A$ calls the station $1_A$, both of which receive switched telephone service from the LEC network $3_1$. Some calls, however, transit two or more carriers' networks. For example, a call from the PC $7_A$ to the ISP equipment $7_c$ would go first through the LEC network $3_1$ and then through the CLEC network $3_2$.

In the illustrated example, the third carrier does not have a direct link into the CLEC's network $3_2$, and calls between the networks $3_2$ and $3_3$ must transit the LEC's network $3_1$. IXCs often have agreements with CLECs to bypass the LEC, and therefore will have direct network connections to the CLEC networks. However, a cellular carrier or another CLEC may not have such an arrangement with the CLEC network $3_2$. In such a case, the third carrier's network $3_2$ initiates and receives calls through the landline network via the LEC network $3_1$, including calls to and from parties served through the CLEC network $3_2$.

From one carrier's point of view the other carriers often are high-volume customers for communication services. For example, from the LEC's point of view, the other two carriers utilize the LEC network $3_1$ to provide large numbers of switched telephone service connections, to each other and to local customers receiving service through the LEC network. As high-volume customers, the LEC has a vested interest in satisfying the needs of the other two carriers. As part of that interest, the LEC must respond to troubles encountered in servicing those customers, that is to say troubles in processing calls to and from the networks $3_2$ and $3_3$. End use customers also are dissatisfied if the LEC network presents blockages and other troubles in processing of their calls, including any of their calls that involve access to or from the networks $3_2$ and $3_3$.

Set-up and tear-down of a call connection traversing two switching offices of the PSTN, for example a call passing through two offices within the LEC network $3_1$, requires an exchange of various signaling information between the two switching offices. Similarly, set-up and tear-down of a call connection traversing two carriers' networks requires an exchange of various signaling information between the offices communicating over the interface between the two networks. Some systems still utilize in-band signaling, within the voice channels on the interconnecting trunks. However, increasingly, the carriers utilize an out of band signaling technique commonly referred to as "Common Channel Signaling" or "Common Channel Interoffice Signaling" (CCIS) because the out of band channel is shared in common for signaling relating to many calls to and from many customers.

Certain ones of the signaling messages, particularly those used in common channel interoffice signaling, include certain codes relating to causes of failures to complete calls. For example, signaling system seven (SS7) includes Release (REL) messages, which contain release cause codes. If a carriers' network uses SS7, all interoffice calls generate an REL message, either during tear-down after one party normally terminates a call or when some network element recognizes a reason for terminating a call without completion. The release cause codes contained in the REL messages for calls that were not completed represent reasons for network failures, for example blockages due to busy status of the called destination, no trunk circuit available between certain offices, etc. The interoffice signaling messages, including the REL messages, also identify the offices involved and the end users involved.

In accord with the invention, certain monitoring equipment in one carrier's network, such as the LEC network $3_1$, receives and captures copies of the signaling messages. The monitoring equipment may receive such messages as exchanged between offices within that network and/or between offices of that network and either or both of the other carriers' networks $3_2$ and $3_3$. Although it is the signaling messages that are monitored, it is not the signaling that is the principle concern. The invention monitors the signaling message to obtain data regarding volumes of call traffic through the underlying switched call processing network.

The monitoring equipment accumulates records 5 of the details of the calls from data contained in the captured signaling messages. The call detail 5 for each call includes a wide variety of different items of information about the call. For example, the information may include calling and called party numbers, the time of the call, the duration of the call if completed, the type of release, identification of office(s) serving the call within each network, etc. The monitoring equipment in the LEC network $3_1$ accumulates similar call detail records 5, both for calls between normal telephone stations and for calls to and from data devices. Because calls to and from the other carriers' networks such as $3_2$, $3_3$ are interoffice calls, this monitoring may also compile detailed call records for calls that the LEC network $3_1$ processes for the CLEC and other carriers.

The call details 5 are supplied through a database input procedure 50, referred to as a "landing zone" process. The landing zone process 50 serves to format the data and load the call details into appropriate tables in one or more relational databases 60. An example of appropriate database software is available from Oracle.

The landing zone or "LZ" process 50 manages the incoming CDR data streams, checking for errors and loading the data into tables set up in the relational database for the purpose of the network traffic study. The LZ 50 buffers incoming records and periodically uploads the records into the tables. The records follow a first in, first out logic at the landing zone. If two types of call detail records are used, e.g. one based on the interoffice signaling and another based on office accounting records, the landing zone 50 may actually comprise two different LZ routines.

The preferred embodiment for analysis of troubles uses one relational database 60 for CDRs developed from trapping SS7 type interoffice signaling messages. If desired, additional CDRs could be developed from other management data messages used by the network, for example, from accounting messages. If the traffic track system compiles CDRs from a different type of messages, preferably those CDRs would be loaded into a second relational database.

The relational database 60 stores the bulk detail data in an accessible form. However, still further processing is needed to allow analysis and output of the results in desired aggregate forms. Data from the relational database 60 is prepared and uploaded in process 70 for input for On-Line Analytical Processing (OLAP) 80.

The preferred embodiment of the on-line analytical processing routine comprises a multi-dimensional database with a presentation layer. The presentation layer may be an independent program or an integral element incorporated in a software package with the multi-dimensional database. The presentation layer provides the user interface, for example in the form of a client-server interface or a web-browser interface. The presentation layer offers the user fast and flexible access to the study data.

The data preparation process 70 summarizes details of calls and categorizes calls into logical groupings. One other function of the data preparation 70 is categorizing the usage data of the calls into "bins" based on the time and duration of the calls.

The data preparation process 70 also may involve modifying each call detail record by application of reference data from other sources, such as profile or service information of one of the parties to the call. In this part of the data preparation operation for the study of traffic encountering troubles, one specific purpose is to combine information from the call detail records with external support system data to textually describe the types of troubles. This operation may also identify the various switching offices, at least within the LEC network, which served each call. If a call transits to another carrier's network, data in the record identifies that carrier; and the translation operation converts that data to a descriptor or name for the carrier. Preferably, this part of the data preparation process 70 utilizes middleware that takes the form of a relatively universal system, with an interface to other data systems, whether it is for forecasting or for looking at marketing data, demographic data, etc.

The processed call detail information is uploaded to the OLAP 80. The OLAP process 80 analyzes the prepared call details and compiles data into reports, for output to a user's terminal 9. The OLAP process provides certain study management tools as well as the user interface. For example, the OLAP system 80 receives the inputs and presents outputs via the user terminal 9, to set up study models, to set-up specific studies using established models and to present study results. The preferred embodiment of the OLAP software is a multi-dimensional database (MDDB) with an integrated presentation layer.

The MDDB 80 captures and stores high level summary data and displays it through the user terminal 9 in a variety of ways. The MDDB enables the user to overlay multiple dimensions when viewing the data, for example, showing originating traffic from one area code generated during certain hours of the day with an average call holding time greater than a specified threshold. The preferred MDDB offers the manipulation of data in a cube concept, where data can be approached from many different directions, providing different slices or views of the data. The preferred MDDB also uses a "drilling down" feature to slice or roll-up (aggregate) data based on the metrics (Minutes of Use, Average Holding Time, Busy Hour identification, etc.) required. The drill-down feature enables the user to access the raw call detail information, when necessary. As one example of drill-down, having found a number of uncompleted calls for a number associated with an ISP, it is possible to drill-down into the data to identify release causes regarding those uncompleted calls.

The application on the MDDB may also provide another point at which the user may access external reference data. For example, having found candidate numbers for ISPs, the application may compare the numbers to those of known ISPs, and reduce the list to a list of new ISP numbers within the CLEC's domain.

The MDDB allows export of data, e.g. to copy a particular presentation from the MDDB into a spreadsheet such as into Excel. The user can then do his own analysis in Excel.

At a higher level, the MDDB enables presentation of aggregate traffic pattern data. For example, it is possible to display Internet access traffic as a percentage of all traffic to a particular CLEC, either based on peg count or usage (e.g. MOU or CCS). MOU (minutes of use) and CCS (centi-call seconds) are measures of total connect time for all calls in a particular collection, for example to a particular ISP. A peg count is a raw number of calls, for example the number of calls to an identified ISP number, or the number of calls to the ISP number that the network failed to complete to the ISP.

Multi-dimensional database software providing the requisite OLAP capabilities is available from Gentia Software, Inc. of Wakefield Massachusetts under the product name of Gentia DB. The Gentia DB is a fully OLAP-compliant multidimensional database. Similar to Essbase, it is loaded with data derived from various company data sources, and is pre-consolidated. Gentia supports an "unlimited" number of dimensions, as well as multiple hierarchies within a dimension. It is a fully object oriented visual development environment, with a library of predefined objects, and provides an OLAP database with tools for loading, analysis, querying, and reporting.

Gentia runs on multiple platforms and is scalable across a large system. The multi-dimensional database program 80 could run on a server, and the relational database 60 might run on a separate server.

Alternatively, two or more of these databases may run within one computer system or server. The server running the multi-dimensional database (MDDB) 80 is accessed by multiple user work stations 9. Although the system may implement a client-server interface, preferably, the MDDB database 80 provides a web suite for a user interface, enabling access using standard browser software in the workstations. The actual server may connect directly to the terminals 9 or communicate therewith through a data network, such as a private LAN or WAN or the Internet.

Logically, the data preparation software 70 runs as a separate (e.g. Oracle) relational database. The MDDB is platform independent and may reside in the same server as the relational database or in a separate server. The data preparation software accesses records from one or more of the relational databases and uploads the prepared data to the MDDB. The MDDB processes data from those records to generate analytical tables, reports and graphs.

The web suite software together with the MDDB software performs all necessary OLAP processing. As part of this function, the software implements a Data Collection and Study Management Tool set, which enables the user to set up and control studies using the traffic track system and run applications to obtain the analytical results. A more detailed description of the MDDB operations and this Tool set may be found in commonly assigned application Ser. No. 09/188,713 entitled DATA PREPARATION FOR TRAFFIC TRACK USAGE MEASUREMENT, and the descriptions of the MDDB operations and Tool set from that application are incorporated herein by reference.

The present invention provides effective monitoring of call processing to identify and analyze specific causes of call releases involved in patterns of traffic through a telecommunication network. The monitoring and analysis may utilize automatically generated accounting messages, such as those for automatic message accounting (AMA), if those messages are adapted to provide adequate release cause information. In the preferred embodiments, the monitoring involves capture of interoffice signaling messages relating to interoffice telephone calls as well as calls between the two carriers' networks.

The interoffice signaling theoretically could be in-band signaling, but preferably, involves out-of-band signaling, i.e. some form of common channel signaling. In the preferred embodiments, the interoffice signaling takes the form of a signaling system seven (SS7) compliant common channel interoffice signaling network. The SS7 signaling extends through and between two or more carriers' networks. The monitoring therefore enables analysis of troubles encountered by traffic within one carrier's network as well as traffic extending to and from the other carriers' networks.

To facilitate understanding of these preferred embodiments of the invention, it may he helpful at this point to review the structure and operation of the telephone network, in somewhat more detail.

Figure 2:
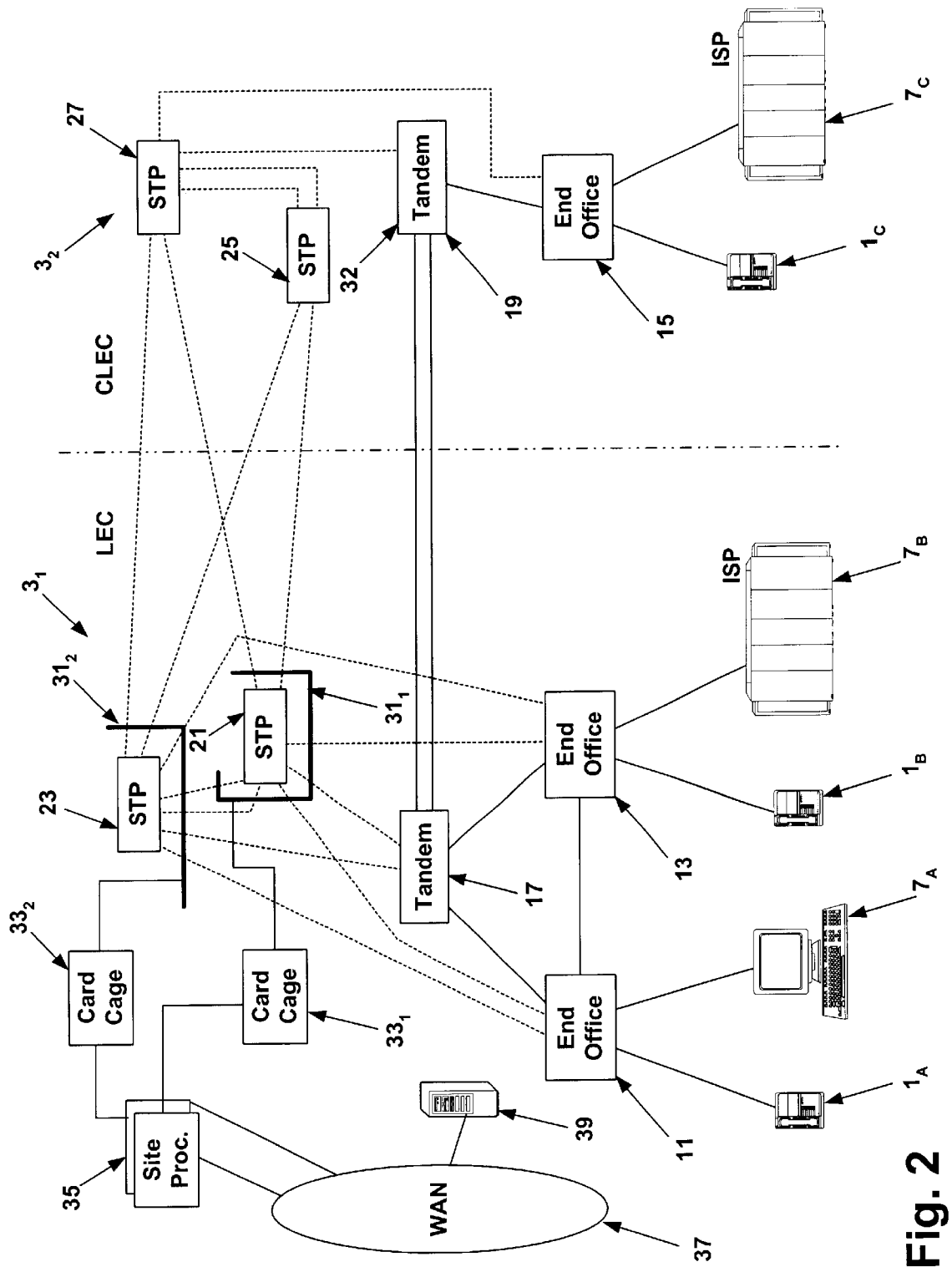
FIG. 2 is a block diagram illustrating a switched telephone network and elements used to capture and analyze call data from that network to implement traffic analysis applications in accord with the invention.

Referring to FIG. 2 there is shown a block diagram of a public switching telephone network and the SS7 network that carries the call control signaling for the switched network. The PSTN comprises networks operated by many carriers. The illustrated embodiment of the invention enables monitoring and analysis of interoffice traffic through one carrier's network and of interconnect traffic transiting the interfaces between networks of different carriers. Persons skilled in the art will recognize that the system may monitor interoffice traffic within any one carrier's network and that the tracking of interconnect traffic may apply to any such traffic. For purposes of discussion of FIG. 2, it is assumed that the interoffice traffic is within a LEC network $3_1$ and that the interconnect traffic transits across the interface between two carriers' networks, specifically between a LEC network $3_1$ and a CLEC network $3_2$.

The switched portion of telephone network consists of a series of central office (CO) switches. For signaling purposes, the central offices are conventionally referred to as signaling points (SPs) in reference to the SS7 network, and some of the offices may also serve as service switching points (SSPs) in reference to an intelligent version of the PSTN. Certain of these SPs comprise end offices (EOs) illustrated at 11, 13 and 15 in the drawing. Other SPs serve as tandem offices, illustrated for example at 17 and 19 in this drawing.

Customers' telephone equipment connects through telephone lines or other links to the end offices. Examples of such equipment include normal telephone stations shown at $1_A$, $1_B$ and $1_C$ as well as various data devices such as the PC and ISP hardware shown at $7_A$, $7_B$ and $7_C$.

Each office serving as a signaling point has a point code comprising a 9-digit code assigned to every node in the signaling network. Messages communicated via the SS7 signaling network utilize the codes to identify source and destination SPs, and the traffic tracking system can use these point codes to identify messages relating to traffic through particular offices.

The end offices 11 and 12 represent end offices in the region of one operating company or LEC, whereas the end office 15 represents one of the end offices in the region of a different operating company, in this case a CLEC. Each operating company or carrier has its own network or "member" ID, which is used as the first three digits of the point codes of the SPs of that carrier's network.

Also, each end office resides within a geographic region assigned NPA (Number-Plan-Area) digits as an area code. Each exchange is identified by one or more three-digit codes, referred to as NXX digits. Each such code corresponds to the NXX digits of an NXX-XXXX (seven-digit) telephone number or the three digits following the three area code digits (NPA) in a ten-digit telephone number. Origination and destination telephone numbers appear in various SS7 signaling messages and various records that the offices create for billing and the like. The NPA-NXX digits of those telephone numbers also can serve as identifiers of the serving end offices. The full numbers effectively identify calling and called subscribers.

Digital trunk circuits, shown as solid lines, interconnect the switching offices of each network 3. Typically, within one carrier's network $3_1$ end offices, such as end offices 11 and 13, are directly interconnected by trunk circuits. For overflow traffic and/or for connections to other carrier networks, the offices 11 and 13 also connect via trunk circuits to a tandem office 17. In the CLEC network $3_2$, the end office 15 connects through a trunk circuit to a tandem 19 or direct to an end office. The LEC and CLEC networks $3_1$, $3_2$ interconnect through trunk circuits shown for example between the tandems 17 and 19, although end office interconnections are possible.

The preferred embodiment of the present invention relies on monitoring of interoffice signaling messages. To understand the monitoring functions it may be helpful to review the interoffice signaling functions of the network, in somewhat more detail.

The SS7 type interoffice signaling network comprises a series of Signal Transfer Points (STPs) shown here at 21, 23, 25 and 27 and interconnecting data links indicated by dotted lines. Each STP in a network connects to the SP or SSP capable offices in that network via A links. Thus, in the LEC network $3_1$, the end offices 11, 13 and the tandem 17 connect to the STPs 21, 23 through A links. Similarly, the end office 15 and the tandem 19, in the CLEC network $3_2$, connect to the STPs 25, 27 via A links.

Within the LEC network $3_1$, the STPs 21 and 23 constitute a mated pair of STPs connected to each other via C links. Within the CLEC network $3_2$, the STPs 25 and 27 also constitute a mated pair connected by C links 58. Each of these mated pairs serves its respective transport area and/or carrier network. Persons skilled in the art will recognize that there may be multiple mated pairs per region or carrier, one pair for each designated transport area. Also, although the STPs appear within one local carrier's network, the CLEC may actually use STPs provided by some other carrier. For example, some CLECs contract with an IXC, such as AT&T, to provide the STP service for the CLEC's network. The STPs provided by the IXC continue to perform the packet switching functions for interoffice signaling for the IXC's own network.

The STP 21 connects to the STP 25 via a B link, and the STP 21 connects to the STP 27 via a D link. Similarly, the STP 23 connects to the STP 27 through a B link, and the STP 23 connects and to the STP 25 through another D link. As will be understood, the A, B, C and D links are physically identical links. The letter designations for these various links relate to cost in terms of ease of access.

The STPs in any mated pair have the same translations. Thus, the translations in STP 21 are the same as the translations in STP 23, and the translations in STP 25 are the same as the translations in STP 27. The translations control the message routing through the STP.

The STPs also may connect through A links to transactional database systems, such as Service Control Points, Integrated Service Control Points or the like. Such database systems, for example, provide call control information for a wide range of recently developed enhanced features. Other database systems such as the Line Identification Database (LIDB) provide information for ancillary purposes, for example, for credit card validation, for enhanced versions of Caller ID, etc. The monitoring in accord with the traffic track invention captures messages going to and from the tandems or end offices. This includes messages exchanged between the offices and the database systems. Although possible, for our purposes, it is not necessary at this time to separately monitor the links to the database systems. Therefore, for simplicity of illustration, these databases have been omitted from FIG. 2.

The present invention preferably conducts trouble studies based on capture and processing of the common channel interoffice signaling (CCIS) messages, signaling system seven (SS7) messages, typically exchanged between offices during otherwise normal call processing. For SS7, typical application layer protocols include Transaction Capability Application Part (TCAP); Operations, Maintenance, Application Part (OMAP); and ISDN User Part (ISDN-UP or ISUP). TCAP provides the signaling protocols for exchange of non-circuit related, transaction-based information, typically for accessing databases such as service control points. OMAP specifies protocols for certain specialized messages relating to maintenance and operations. Although the tracking system can capture and analyze TCAP and OMAP messages, for purposes of the presently preferred embodiments, the most relevant part is the ISDN-UP, sometimes referred to as "ISUP".

ISDN-UP specifies the procedures and message protocols for setting up and tearing down trunk connections, for calls utilizing common channel interoffice signaling (CCIS). ISDN-UP messages, for example, include set-up related messages such as an Initial Address Message (IAM), an Address Complete Message (ACM), and an Answer Message (ANM). ISDN-UP messages also include tear-down related messages, such as a SUSpend (SUS) message, a Release Message (REL), and a Release Complete Message (RLC).

An originating office sends an IAM message to an office terminating the next leg of a call, i.e. in the forward direction, to initiate seizure of an outgoing trunk connection. The IAM message provides information, such as calling and called party number information, for routing and handling of the call.

The terminating office sends the ACM message in the backward direction to the originating office. The ACM message indicates that the terminating office has all of the address signals necessary for routing the call to the called party. If the called destination is available (not busy), the ACM message also indicates this status of the destination.

The terminating office sends the ANM message in the backward direction to the originating office. The ANM message indicates answering of the call, and thus, the start of the completed connection for billing purposes and the like.

The REL may be sent in either direction, i.e. by either the originating office or the terminating office. At least one office processing an interoffice call will always send an REL message, to indicate that a call can not be completed or as part of the signaling to tear down a circuit after one or both parties disconnect. The REL message identifies a circuit and indicates that the circuit is being released. The REL message includes a cause code specifying the reason for the release.

An office receiving an REL message executes its procedures for returning the identified circuit to idle and then informs the other office by sending back an RCL message. The RCL message effectively informs the other office that the circuit has returned to its idle state.

If a called party not having ISDN service disconnects or hangs-up to end a call, the terminating end office detects this condition and sends an SUS message. The SUS message indicates the disconnect and causes the originating office to initiate its procedures for tear-down, for example by sending an REL message to the terminating office.

The lower three layers of the SS7 protocol, the network layer, the signaling link layer and the data link layer, form the Message Transfer Part (MTP) of SS7, for the TCAP, OMAP and ISDN-UP protocols. The MTP is common to messages for all applications and provides reliable transfer of signaling messages between network nodes. The MTP relays messages between applications running at different nodes of the network, effectively like a datagram type service.

Figure 3:
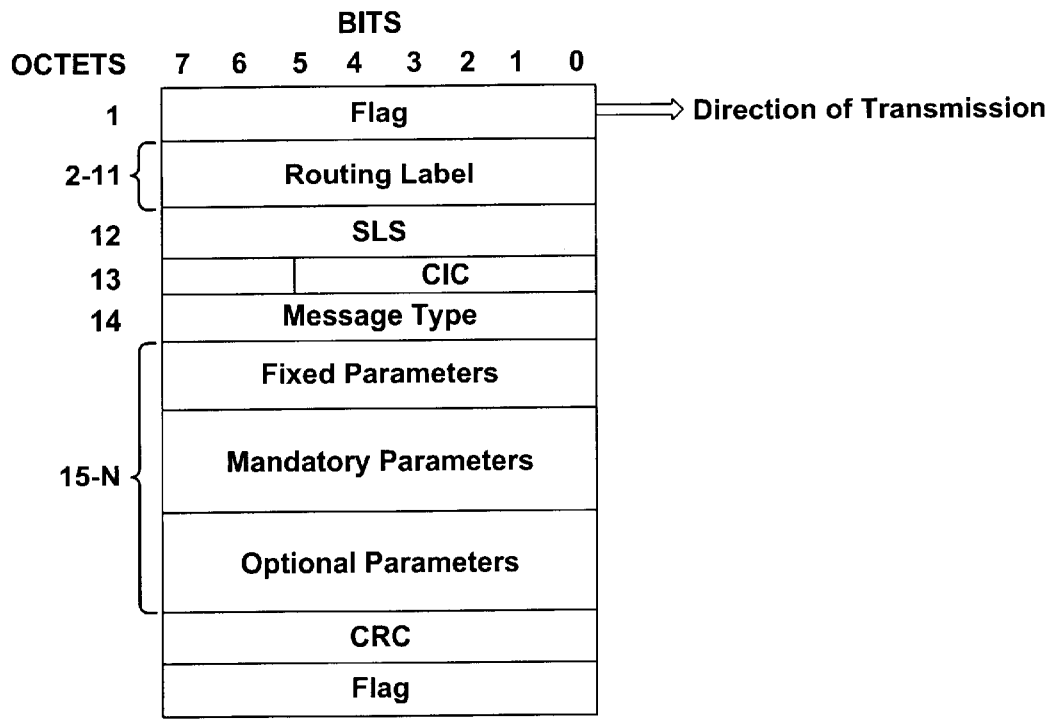
FIG. 3 illustrates in graphic form the layout of an SS7 protocol interoffice signaling message.

The SS7 messages comprise digital serial messages sent to an STP for routing. FIG. 3 provides a graphic illustration of an SS7 message packet. The message is arranged in 8 bit bytes or octets. The message includes octets representing a start flag, a routing label for MTP processing and certain specialized indicators. Examples of such indicators include a Signaling Link selection Code (SLC), a Carrier Identification Code (CIC) and a message type indicator. Octets 15–N carry the information of the message in the form of fixed, mandatory and optional parameters. The lengths of the mandatory parameters field and the optional parameters field are variable. The message ends with an octet for a cyclic redundancy code for error correction, which typically is followed by the flag at the beginning of the next message.

For purposes of the MTP processing, each SS7 message includes the routing label in octets 2–11. Several of the inventive traffic tracking studies rely on translation and/or analysis of certain addressing information from the SS7 messages, for example to identify LEC originating offices for calls terminated in the CLEC network $3_2$. The addressing information used for the MTP and for the traffic analysis appears in the routing label.

Figure 4:
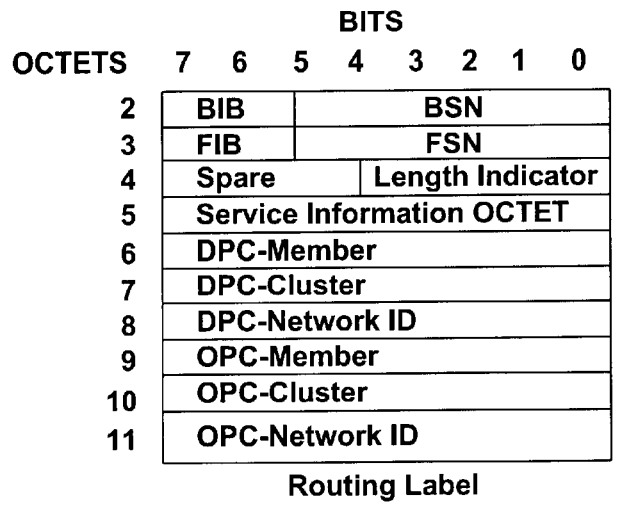
FIG. 4 graphically depicts the layout of the routing label portion of the SS7 message of FIG. 3.

FIG. 4 is a graphic illustration of the routing label of the SS7 message packet. The routing label includes a series of indicators, a service information octet and fields for both destination related addressing and point of origin addressing.

Octet 5 is the service information octet. This byte indicates the type of service information, for example by inclusion of a code for a Message Signaling Unit (MSU).

The origination or 'calling party' address for the SS7 packet message itself includes octets 9, 10 and 11. These 'calling party' address octets carry origination point code (OPC) information, for example member, cluster and network ID information, for the node on the SS7 network sending the message. Typically, in an ISDN-UP message, this code identifies the SP office (end office or tandem) transmitting the message.

The destination or 'called party' address for the SS7 packet message itself includes octets 6, 7 and 8. These three octets often carry destination point code (DPC) information for example member, cluster and network ID information, for the node on the SS7 network targeted to receive the message. Typically, in an ISDN-UP message, this code identifies the SP office (end office or tandem) intended as the recipient of the message.

In operation, the translation tables stored in an STP cause the STP to actually route based on the DPC, without translating any of the DPC octets into new values. The called party address octets (6–8), however, may carry other types of called party addressing information and receive different treatment by the STP. One example of another type of address for the destination comprises a global title translation (GTT) and subsystem number (SSN) information, which serve as a virtual address for an SS7 message. The STP examines a message signaling MSU type indicator in each message to determine if there is a need for translation, e.g. from GTT to DPC, and if so, translates the information to a DPC before routing the message.

In both the DPC and OPC, the member number corresponds to the carrier's network. In the example of FIG. 2, the SP capable offices 11, 13 and 17 of the LEC network $3_1$ all would utilize the same unique member number. The SP capable offices 15 and 19 of the CLEC network 3$_2$ all would utilize the same member number, but that number would be unique and different from the member number used in the LEC network 3$_1$. As discussed more later, one feature of the trouble analysis involves translations of data from the SS7 messages into descriptive textual information. For example, the processing may translate the member numbers into the names of the carriers and translate the point code information into office identifiers, in order to help pinpoint the location of network troubles.

For each interoffice call, an ISDN-UP REL message initiates call release and carries a cause code indicating the reason for the release. An REL message utilizes the general SS7 format described above relative to FIGS. 3 and 4. The REL message includes a parameter field for a release cause indicator, having a layout as graphically illustrated in FIG. 5. As shown, this parameter field includes two octets for location and cause information. The field optionally includes octet(s) for diagnostic information.

The first bit of each of the first two octets is an extension indicator flag. If such an extension bit is a 0, it indicates that information continues into the next octet. A 1 in an extension flag position indicates that the associated octet is the last octet. In the first octet, the next two bits identify the coding standard. Typically, these bits are 00 to identify the default to the CCITT coding standard. The next bit is a spare, but the last four bits of the first octet provide a location code. For example, a 0000 value in the location bits would indicate a user location, a 0001 value would indicate a private network, a 0010 would indicate proximate local network, a 0011 would indicate a transit network and a 0100 would indicate a remote local network.

The second octet of the cause indicator parameter field contains seven bits representing a cause value, i.e. the actual release cause code. These seven bits actually may be divided into two separate fields. Specifically, bits 5–7 serve as a class identifier field, and bits 1–4 carry the actual cause value within the class. The values 000 or 001 in bits 5–7 specify a normal event class of release causes. For example, the seven bit value 0010000 (decimal 16) indicates a normal event—normal clearing, e.g. after one party hangs up a call. As another example, 0010001 (decimal 17) indicates a normal event—user busy.

The value 010 in bits 5–7 specifies a class of events relating to a resource unavailable condition. For example, 0100010 (decimal 34) indicates no circuit available, and a 0101010 (decimal 42) indicates switching equipment congestion.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. Complete listings of the location codes and release cause values appear on pages 10 and 11 of section T1.113.3 of that Requirements document.

The SS7 network constitutes a highly redundant data network, generally using 56K switched data circuits for the various links to and between the STPs. Because of the redundancy, different signaling messages for a given call may actually transit different routes through the SS7 network.

An SS7 monitoring system may be implemented on any carrier's portion of the PSTN. In the example illustrated in FIG. 2, the LEC network 3$_1$ uses the monitoring and call detail compilation equipment, for the traffic tracking in accord with the present invention. According to the invention the LEC portion of the public switching telephone network (PSTN) is provided with a traffic monitoring and analyzing system comprising monitors 31, card cages 33 and one or more site processors or servers 35, of the type described in detail in the above discussed Pester Patent. One commercial implementation of such an SS7 monitoring system is currently available from Hewlett Packard, under the product name "AcceSS7".

FIG. 2 shows the sets of monitors or interfaces 31$_1$, 31$_2$ to the SS7 links to the STPs 21, 23 in diagrammatic form, as solid bold lines across respective links. A card cage 33$_1$ connects the monitors 31$_1$ to a site processor 35. Similarly, a card cage 33$_2$ connects the monitors 31$_2$ to the same or another site processor 35. The monitors 31 may be conductively or non-conductively coupled to the links to serve as passive interfaces. Alternatively, the monitors 31 may comprise active traps. The card cages 33 connect the monitors 31 to the site processor 35 for accumulation, storage and processing of the raw SS7 messages.

It is intended that multiple monitoring systems of this type serving different purposes may advantageously exist in the PSTN, for example for operations monitoring and/or fraud detection, in addition to the system illustrated for traffic tracking and analysis. For simplicity and clarity, however, only a single system is here illustrated.

The SS7 signaling in a completed call typically includes an Initial Address Message (IAM), an Answer Complete Message (ACM), an Answer Message (ANM), a Release Message (REL) and a Release Complete Message (RLC). The signaling messages for a call that does not complete will include at least the IAM, REL and RCL messages. Since the common channel signaling system is intentionally redundant, the messages in a related set may be routed over different A links and/or through different STPs.

Consider first a simple example of a call within the LEC network 3$_1$. On a call from PC 7$_A$ to ISP equipment 7$_B$, the IAM may go through STP 21, whereas the ACM and ANM may just happen to go through the STP 23. The REL and RCL messages also may use different links and/or different STPs. It -is therefore necessary to monitor an appropriate set of links and to reassemble the signaling pertaining to a desired transaction or signaling message set such as for a single call, to provide one call detail record or CDR. This is accomplished in the site processor 35 in a known manner as described in the Pester or Brockman et al. Patents.

It should be noted that the PSTN conducts signaling on all interoffice calls, and the monitoring system can actively or passively trap messages and compile CDRs for all interoffice calls. In particular, the system provides CDRs for both calls completed to a destination station and calls that terminate without completion. For example, the system accumulates CDRs for calls that are blocked because the called line is busy, because there are no network resources available to the terminating end office (network busy), etc.

With the reassembled message sets the site processor 35 has the data to show the called and calling stations 7$_A$, 7$_B$, the start time and elapsed time of the call if completed, the originating office, the terminating office, and various other detailed data. The data also shows the cause of release, particularly if a call is not completed. By monitoring the SS7 signaling for all of the calls originating in, terminating in or passing through a designated switch, such as the tandem switch 17, it is possible to analyze traffic to identify particularly significant patterns through that switch. Similar monitoring can compile CDRs from the signaling for calls interconnected between the LEC network $3_1$ and any other carrier's network.

As an example, based on a pattern of calls through the tandem 17 to a certain number, it is possible to identify the number of an ISP 7C, even though that ISP is served through the CLEC switch 15. Knowing that number, it is possible to gather all of the desired information about calls going to the ISP 7C via an interswitch path, including the numbers of calling customers receiving service from the CLEC network $3_2$ and the number of calls or minutes of use of such calls by each customer. The data collection includes the release cause codes thereby enabling analysis of patterns of troubles encountered by such calls, to the ISP or from the ISP's customers served by the LEC.

The assemblage of the raw call detail data desired for a particular purpose occurs at the site processor level. One or more site processors 35 accumulate the CDRs for the traffic monitoring applications of the present invention. Periodically, each site processor 35 transmits the latest set of CDRs over a private wide area network (WAN) 37, operated by the LEC for its internal business purposes. The WAN 37 may carry a variety of LEC network operations data. For purposes of the discussion, the WAN transports the CDRs from the site processor 35 to a server system 39.

The server system 39 comprises one or more computer systems coupled for communication over the WAN 37. The computer(s) of the server system 39 run software implementing the landing zone process 50, the relational database 60, the data preparation operation 70 and the OLAP 80 (see FIG. 1). One or more computers in the server system 39 also provide communications between the OLAP program 80 and the user terminals 9, to enable the users to set-up and manage specific studies and to access results.

In the SS7 protocol, there are 51 values associated with release cause codes, which potentially may appear in the REL messages and thus in the call detail record. Preferably, the site processor 35 culls this number down, somewhat, to a more manageable number for increased efficiency and performance in the subsequent processing. To that end, the traffic track system could use the 23 values that match the classes for cause codes under the SS7 standard, specifically the codes falling under the release classes: Normal, Network Resource Unavailable, Protocol Error, Invalid Message and Interworking. However, even some of these codes are seldom used, particularly in processing of the major types of traffic.

The preferred embodiment therefore uses 13 cause code values, reclassified as follows:

Normal Release:
1) call rejected
2) destination out of service
3) facility rejected
4) normal clearing (release)
5) normal unspecified (default)
6) user busy Network Resource Unavailable
1) Bearer capability not implemented
2) Bearer capability not presently available
3) No circuit available
4) Requested channel not available
5) Temporary Failure
6) resource unavailable Interworking
1) Interworking, unspecified (default)

Each category includes a default code. Some call releases may actually utilize the default codes. Also, the site processor 35 maps any detected codes not precisely matching codes used in the traffic tracking applications into an appropriate one of the default cause codes that are used by those applications.

The 13 release cause code values are available to users who access any of the applications relating to SS7 CDRs in the Gentia MDDB 80, including applications and drill-down operations specifically relating to trouble analysis. Those skilled in the art will recognize that new or expanded study applications may dictate an expansion of the list of cause codes processed by the traffic track system.

Figures 5, 7:
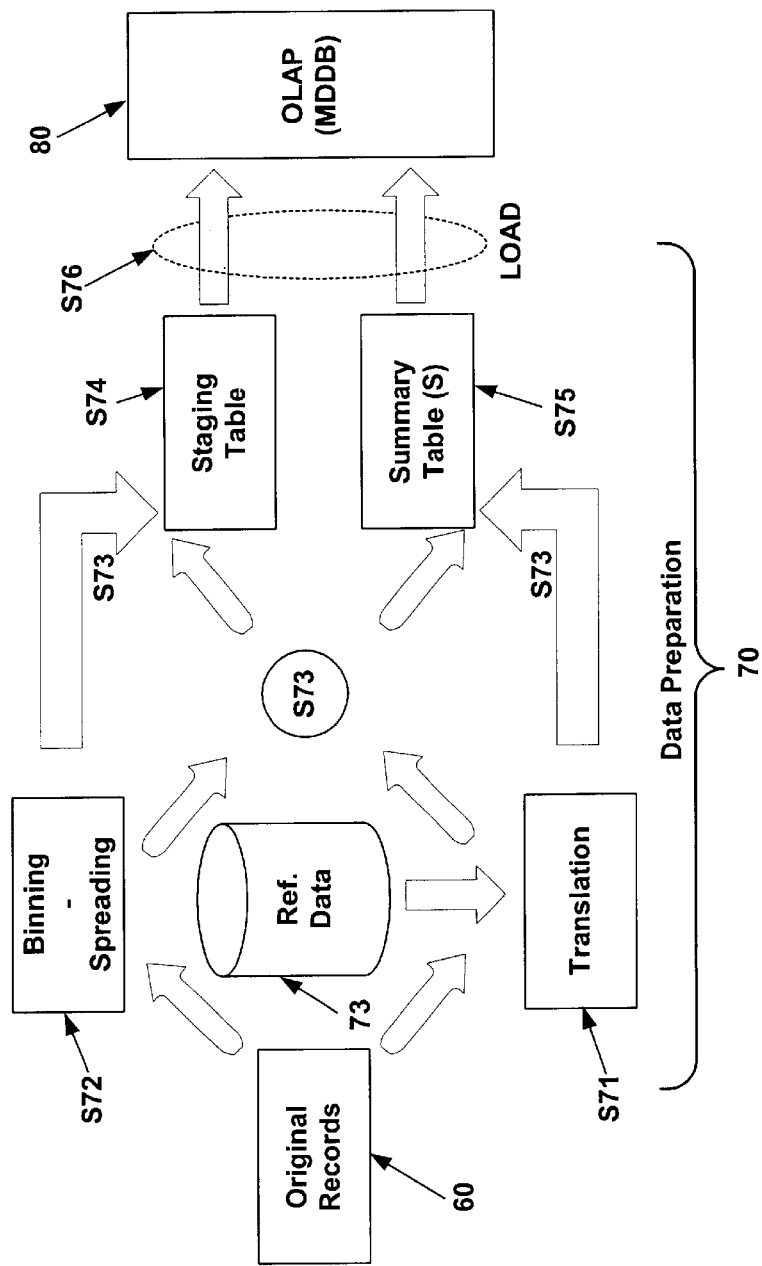
FIG. 5 depicts the layout of a cause indicator parameter field, for example, included in an SS7 interoffice release signaling message.
FIG. 7 is a flow chart useful in explaining the operations involved in data preparation in the traffic track system.

At the SS7 message level, the release cause codes comprise seven bits of information (see above discussion of FIG. 5). The site processor compiles CDRs from the SS7 messages. At this stage, the cause codes in the CDRs remain in the form of binary codes. The CDRs in the relational database 60 are tabulated but still contain precisely the information supplied by the site processor. As discussed in more detail later, the data preparation stage enriches the CDR information, in particular, by translating the binary codes into more readily understandable textual information.

It should be noted that the CDR compilation and forwarding routine in the site processor 35 executes a special procedure for long duration calls. If a call is in progress at the point in time for its programmed uploading to the relational database 60, say midnight, the site processor 35 creates a "call-in-progress" CDR, indicating the start time and duration of the call to that point. Later, when the call ends, the site processor creates another CDR as if the call started at the point in time (midnight) and lasted for the remaining duration of the call from that time until release. As discussed more later, the data preparation routing typically runs at a set time, such as midnight. This routine by the site processor facilitates accurate allocation of connect time data, even for those calls that remain in progress at the time of uploading and data preparation.

It will be understood that some calls are completed through a single switch, such as a call from a PC (not shown) associated with the telephone 1B through the end office switch 13 to the ISP 7B. Such intra-office calls will not generate the above discussed SS7 signaling and thus will not be reflected in the CDRs developed from such signaling. If a particular study requires tracking of such intra-switch calls, for example a study of a CLEC that connects directly to a port of the end office switch, the invention may also utilize data accumulated from certain switch messages normally utilized for billing and other accounting purposes. A more detailed discussion of using automated message accounting (AMA) records as a secondary source of the CDR data appears in commonly assigned copending application Ser. No. 09/188,712 entitled "TRAFFIC TRACK USAGE MEASUREMENT SYSTEM", and that description is incorporated herein by reference.

Use of the AMA records may enhance certain types of studies, such as studies of ISPs like $7_B$. However, present versions of AMA do not provide records of uncompleted calls or release cause codes for such calls. Unless the AMA records are enhaned, the study of release causes utilizes the SS7 signaling messages, which are required by standard to include release cause codes for uncompleted calls.

Figure 6:
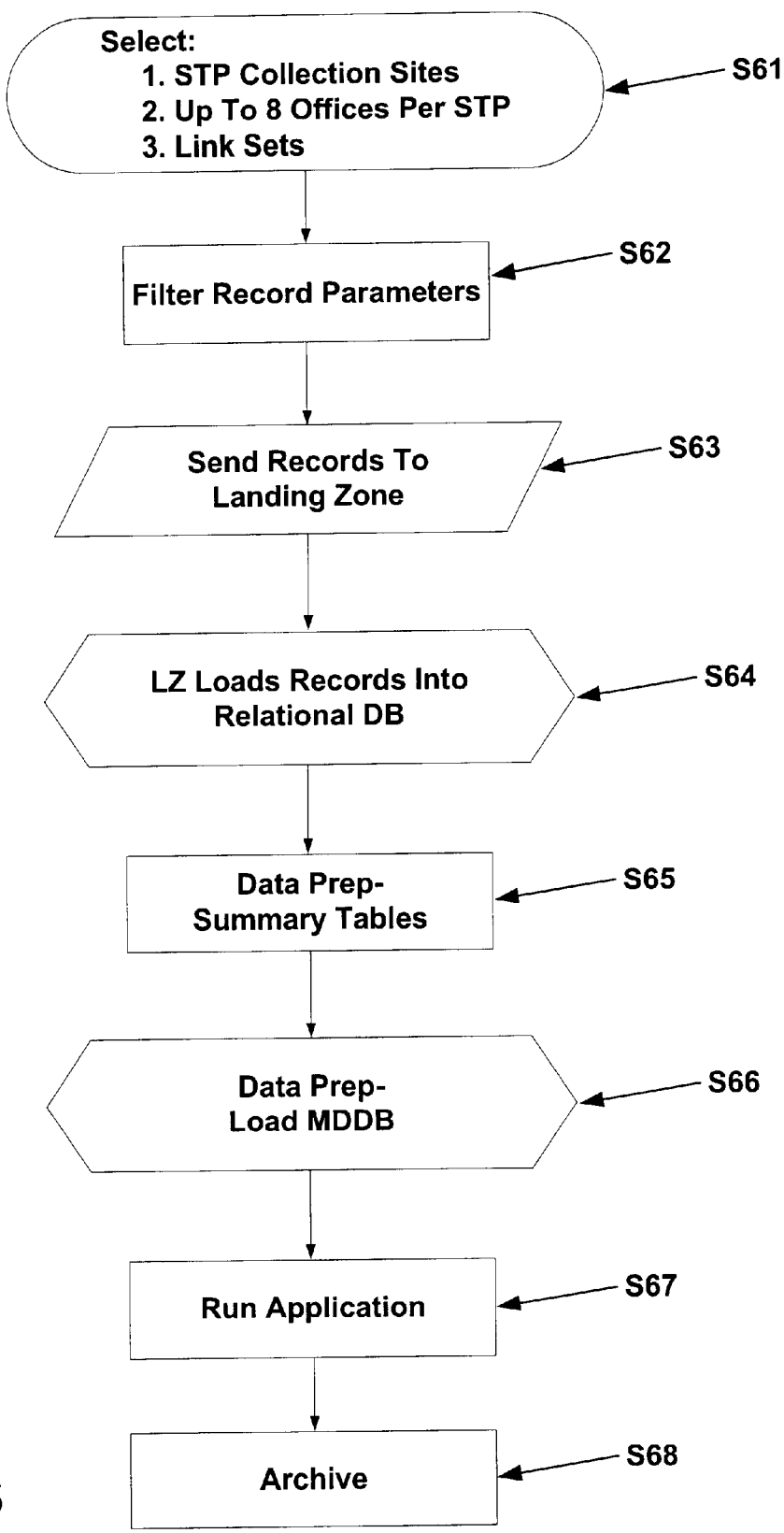
FIG. 6 is a flow chart illustrating the high-level process of overall management of a traffic track study.

FIG. 6 is a flow chart depicting the overall flow of study management. This study process flow applies to any type of study conducted through the traffic track system, including management of transit traffic studies of network troubles as well as studies of traffic patterns (e.g. to ISPs) with associated trouble reporting capability. As shown at step S61, the process essentially begins with the user inputting a number of study selections. Consider a study based on monitoring of interoffice signaling, for example to study transit traffic to and from the CLEC network $3_2$ and related troubles. Such a study would involve input of the three selections, the signal transfer point (STP) collection sites, a number of offices associated with each STP (up to 8 per STP) and the link sets to be monitored. In the CLEC study example, this preferably sets the system to monitor the B and D links between the two STP pairs 21, 23 and 25, 27.

The network elements monitor the messages and compile records. The site processor 35 filters the records by parameters (S62), based on the input selections. For the CLEC study example, the site processor will compile the CDPs for calls over the trunks between the tandems 17, 19, i.e. the calls interconnected between the networks $3_1$, $3_2$. In step S63, the monitoring equipment transmits the records (CDRs) to the landing zone 50. The landing zone process 50 loads the records into the tables for this study established in the appropriate relational database 60 (step S64).

A two-dimensional database record such as a CDP is just a flat file. A two-dimensional database has individual tables, created for a given collection. The relational database 60, for example for interoffice signaling records, stores Call Detail Records (CDPs) for millions of calls relating to a particular traffic study. In a study for traffic to and from the CLEC, in our current example, the table would contain CDRs compiled from the SS7 messages on the B and D links between the STP pairs. The landing zone process 50 for the SS7 records takes all of those Call Detail Records and loads them into one or more tables set up for the exemplary study. Such a table includes every Call Detail Record for completed and uncompleted calls and every dimension or piece of information within the individual Call Detail Records, in a linear form. One such dimension is a field for the bits of the release cause codes from the SS7 REL messages. As a result of the landing zone processing 50, there is a table, within the table there is CDR 1, CDR 2, etc., within each CDR there are X dimensions for the X different items of information within each CDR, and one dimension in each CDR relates to the release cause code.

In the relational database 60, the call detail records include study identifiers and a study "type" flag. The identifiers can be used to identify the particular studies to which the records relate. The study type flag indicates the general type of the particular study, e.g. tandem, Internet, CLEC, etc. Preferably, the software running in the site processor(s) 35 adds the study identifiers and the study "type" flags to the call detail records before supplying the records through the landing zone procedure 50 to the relational database 60.

The data preparation routine 70 prepares a staging table and possibly one or more summary tables (S65). This involves various translations using reference data, the binning or spreading of records to properly allocate usage time and the loading of data into the appropriate tables. For trouble analysis, the translation operation at least includes translation of the seven bits of the release cause codes into textual descriptions of the release causes. The staging table includes all of the CDRs, as enriched in the data preparation stage. A summary table contains summary information accumulated from the enriched CDRs. The data preparation routine 70 loads the tables into the MDDB 81 (S66).

Within the MDDB software, a study application is run to present the data to the user (S67). The study application corresponds to the particular type of study, e.g. tandem, Internet heavy user finder, ISP finder, etc. The study application may relate to troubles, e.g. by class or specific type. The other types of studies include analysis of related troubles, and the applications include drill-down capability, e.e.g to drill-down and access the release cause data. In our example, the study application relates to one of several types of study of transit traffic interconnected to or from a CLEC. The study results also are archived (S68) for future reference. If necessary for the particular study, e.g. for CLEC billing reconciliation, the archiving may include the original record data from the relational databases.

Although not shown, upon completion of the particular study, the application running on the MDDB may enable the user to access other data. For example, in an application which identifies end user telephone numbers, such as an ISP finder application or an Internet user finder application, such other data sources might provide the name and address of each identified user. This might enable the LEC to market certain services to the identified parties. For example, this identification might facilitate marketing the LEC's now digital subscriber line services to high-end caller's to the ISP $7_c$ served through the CLEC network $3_2$ and/or marketing of T1 or higher rate services to the lSP served by the CLEC. Examples of such other databases 83 include the Customer Record Information System (CRIS), the Loop Maintenance Operations Systems (LMOS) and the Line Identification DataBase (LIDB).

FIG. 7 is a high-level process flow diagram depicting the operation of the data preparation routine 70. As noted, data preparation involves essentially three major functions, data translation, binning and assignment of records to tables.

In step S71, the original records from the relational database 60, preferably CDRs compiled from monitoring of interoffice signaling messages, can be translated using external reference data 73. typically, the reference data 73 provides a translation of the data elements or codes from a raw form to some more useful form.

In the SS7 messages and thus in the raw CDRs in database 60, the release cause codes appear as numeric codes. One function of the translation operation S71 involves accessing a table in refrence data 73 and using that table to translate the release cause codes from numeric form to corresponding text accurately describing the causes of releases. As noted earlier, the presently preferred embodiment uses a limited subset of the cause codes supported by SS7. The translation operation converts the codes to textual descriptors as follows:

Normal Release:
0010101 (21)=Call rejected
0011011 (27)=Destination out of service
0011101 (29)=Facility rejected
0010000 (16)=Normal clearing (release)
0011111 (31)=Normal unspecified (default)
0101111 (47)=Resource unavailable (default)
0010001 (17)=User busy Network Resource Unavailable
1000001 (65)=Bearer capability not implemented
0111010 (58)=Bearer capability not presently available
0100010 (34)=No circuit available
0101100 (44)=Requested channel not available
0101001 (41)=Temporary Failure Interworking
1111111 (127)=Interworking unspecified (default)

The subsequent analytical processing of the release causes can provide summary data regarding releases based on the three broad categories: Normal Release, Network Resource Unavailable and Interworking. The processing also can present summary data broken down by the individual causes, e.g. number of calls with release caused by a user busy.

Preferably the data translation operation S71 also translates certain data from the CDRs into identifications of the serving offices. For example, the software may take the OPC or DPC address information from the interoffice signaling messages or the NPA-NXX digits from telephone numbers included in the records and access associated reference data 73. Here, the reference data would provide translations of the record information into the common language location identifier (CLLI) codes for identification of the serving switches. In this way, the enhanced records would provide descriptive identification of the switch serving the caller and/or the switch serving the called party for each recorded call. In this manner, it is possible to provide a descriptive identifier of the switch that issued the REL message, in order to place the cause codes in the proper context. If the CDR data includes the cause location codes from the REL messages, the translation operation S71 would also translate those codes into descriptive text.

The data preparation program 70 also executes an algorithm for binning or spreading of usage data from the records, to properly allocate usage that may extend over multiple hours to the appropriate hourly time periods (S72). For engineering purposes, it is important to know traffic loads by hours, particularly to identify typical peak busy hours and determine loads and blockages during such hours. Using the usage data and release data for blocked calls, for example, it is possible to determine the correlation of peak busy times to time of blockages, particularly if caused by lack of network resources. Categorizing calls and CDRs by hours is significant here because CDRs often relate to calls that can span hours. For these reasons, another significant operation of the data preparation process is to make sure that the calls are binned into the hours of the actual usage.

For example, an Internet access call might start from PC 7A to ISP 7C at 8:15PM and last until release at 10:20PM. As such, the start-time hour would be the hour from 8 to 9 PM, but all of the minutes of use for the call should not appear in that one hour. The binning process allocates 45 minutes of use in the 8 to 9 o'clock hour, 60 minutes in the 9 to 10 o'clock hour, and then 20 minutes in the 10 to 11 o'clock hour. To achieve this accurate binning of calls from the CDRS, the data preparation operation goes through every single CDR, examines the start time and duration and applies minutes of usage into the correct hour of the day.

The binned results enable the LEC personnel to analyze traffic by hours, for example to identify the peak busy hour for a CLEC and to identify the peak busy hour for Internet access traffic into that CLEC's network. Records for any blocked calls indicate the time of the call. Thus, different categories and types of blockages can be categorized by hours of the day. In this manner, troubles and blockages indicated by the cause release codes can be correlated to levels and types of traffic patterns occurring at different times of the day. Identification of ISP numbers together with a correlation of the CLEC busy hour to the ISP busy hour would indicate that the CLEC is heavily marketing services to ISPS. The release cause code information would then indicate the level of blockages and other troubles encountered by such traffic and the locations thereof. The LEC could use this data to upgrade the network to relieve congestion and/or to demonstrate to authorities the impact of the CLEC's marketing practices.

At step S73 (shown as multiple transfer arrows) the enhanced records resulting from the translation (S71) and the binning (S72) are compiled into one or more predefined tables, by application type. In the illustrated embodiment, the data preparation program 71 generates a staging table (S74) and one or more summary tables (S75). The staging table contains the complete enriched record information, whereas a summary table contains a more limited set of information to provide a desired summary of certain aspects of the traffic. For example, for the CDRs formed from monitoring of SS7 interoffice signaling, the staging table is the primary table used for binning all of the calls. The binned results also are forwarded to a second table or to a third table for summaries prior to input into the Gentia implementation of the MDDB 80. Other commonly used SS7 CDR summary tables include an "Office_Pair" table for tandem studies and CISEC studies and an "Office_Summary" table for end office studies.

At step S76, the data preparation routine 70 uploads the resulting tables into the OLAP program, in the preferred embodiment, the MDDB 80.

A more detailed description of the major functions of the data reparation procedure may be found in commonly assigned application Ser. No. 09/188,713 entitled DATA PREPARATION FOR TRAFFIC TRACK USAGE MEASUREMENT, and the detailed disclosure of that procedure from that application is entirely incorporated herein by reference.

The data preparation routine may be written in PL/SQL language. The data preparation routine 70 preferably runs on the same computer that maintains the relational database and effectively runs on top of the relational database application 60. The data preparation process 70 accesses additional reference data 73 that may reside in the same or a separate computer system.

The data preparation function is an automatic process. Although there are some common aspects for all studies, data preparation preferably is adapted to different types of studies.

To enable the automatic data preparation function, as part of the initial set-up of a study, the CDP data from particular sources is pointed at the appropriate data preparation function based on the study-type flag in each CDR. In a CLEC study of traffic over the interface between the tandems, for example, the data captured by the SS7 monitors 31 and the site processor 35 goes through the CLEC traffic analysis version of the data preparation process 70.

Each study runs for some pre-determined period of time selected by the user. The results, however, are available in real or near real-time. The post collection processing could take several days or a week, depending on available processing power. Preferably, results will be available overnight. For example, if a user sets up a study on ISP traffic through the end office 13 for Sep. 10, 1998, the study begins at midnight, data is uploaded to the server system 39 periodically for the 24-hour period on that date. The SS7 data records are collected into the landing zone 50 at midnight and uploaded into the relational database 60. Then the data preparation 70 for the new CDRs begins at one o'clock (AM) the next morning and finishes loading into the MDDB 80 about four o'clock (AM). The results of the study are available to the user at the beginning of the next business day, e.g. nine AM Sep. 11, 1998. For a study over a longer period of time, e.g. a month long study for CLEC billing purposes, the user can access the latest results each morning.

The SS7 network constitutes a highly redundant data network, generally using 56K switched data circuits for the various links to and between the STPs. Because of the redundancy, different signaling messages for a given call may actually transit different routes through the SS7 network. The monitoring system is set for a given study to capture all signaling messages regarding traffic of interest for purposes of the particular type of study application.

Returning to FIG. 2, consider a trouble study of ISP traffic as a first simple example. The intent is to capture all of the SS7 signaling messages relating to each call to an ISP. To understand the set-up and operation of the study, consider first the processing of several calls to an ISP. First, assume that a user places an Internet access call from the PC $7_A$ to the ISP equipment $7_B$. The user at PC $7_A$ activates the appropriate software routine to initiate dialing of the main number of a hunt group connected from end office 13 to the ISP equipment $7_B$. The SP end office 11 checks to see if a trunk is available to the end office 13 serving the dialed number. If so, the office 11 generates an Initial Address Message (IAM) with a destination point code for the end office 13 and an originating point code of the end office 11. The IAM includes a variety of information needed for call set-up, including the number of the line to the PC $7_A$ and the dialed number. The end office 11 sends the IAM either to STP 21 or to STP 23. That STP examines the address information and its translations and routes the message offer the next appropriate link, in this case over the A link to the end office 13.

In response to the IAM message, the end office 13 determines whether or not one of the lines in the hunt group corresponding to the dialed number is available. If at least one of the lines is available (not busy) the end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to the end office 13, and it may go to the other STP of the pair. Again, the STP receiving the message examines the addresses and uses its translations to forward the message over another link to the appropriate destination, in this case to the end office 11.

The end office 11 sends ringback tone over the line to the modem in the calling PC $7_A$. If the PC $7_A$ provides audio output, the calling party may hear a ringback tone, and the caller and her data equipment await an answer. At about this time, the end office $7_B$ applies a ringing signal to the line to the called station $7_B$.

The ISP equipment $7_B$ detects the ringing signal, and if operative, that equipment establishes an off-hook condition on the line to answer the incoming call. The end office 13 detects this new condition as an answer or "ring-trip" and interrupts the ringing signal on that line. The end office 13 also sends an Answer Message (ANS) back through the SS7 network to the end office 11, indicating that the called station $7_B$ has answered.

At that time the necessary trunk circuits between the end offices are connected together and assigned to the call. The trunk connection may run through the tandem 17, if no direct trunk was available. Routing through the tandem would require separate call set-up and signaling for each leg of the call to and from the tandem, so for this simplified example, it was assumed that the trunk connection should extend directly between the end offices. The end office 11 connects the line for the PC $7_A$ to the trunk circuit, and the end office 13 connects the line for the ISP equipment $7_B$ to the trunk circuit. At this point a complete voice-grade telephone connection exists between the two data devices, and the data devices can exchange modulated audio signals carrying various data between the user on PC $7_A$ and the Internet accessed through equipment $7_B$.

Hours later, when one of the parties terminates the session, the offices 11, 13 exchange REL and PLC messages via either of the STPs 21, 23 as part of the procedure for tearing down the call connection over the trunk circuit. The precise procedure for release differs slightly depending on the type of service, POTS or ISDN, provided to the called party, in this case the ISP $7_B$. If the ISP subscribes to ISDN service, one of the end offices 11, 13 detects that the device $7_A$ or the device $7_B$ has disconnected (gone on-hook) The office detecting this condition sends the REL message through one of the STPs 21, 23 to the other end office, which responds by sending the RCL message when it returns its circuit to idle. If the ISP does not have ISDN service, but the calling party using PC $7_A$ disconnects first, the office 11 sends the REL message and the office 13 responds with the RCL message. However, if the ISP does not have ISDN service and the ISP equipment $7_B$ disconnects first, the procedure is slightly different. In this case, the terminating end office 13 sends a SUSpend (SUS) message through one of the STPs to the office 11. The SUS message informs the originating office 11 of the disconnect, and the end office 11 initiates tear-down of the call connection. The end office 11 sends the REL message through one of the STPs 21, 23 to the end office 13, which returns the RCL message. In each case, the REL message contains a release cause code for a normal event-normal clearing (0010000-16).

To capture all of the interoffice signaling messages relating to the call, the card cages 33 are set so that the monitors 31 capture A-link signaling messages going to and from either one or both of the end offices 11, 13. For a study of overflow interoffice traffic through the tandem, the card cages 33 are set so that the monitors 31 capture A-link signaling messages going to and from the tandem 17. For the exemplary call, the site processor compiles a CDR from the complete set of SS7 messages relating to that call, including the IAM, the ACM, the ANM, the REL and the RCL.

The same monitor set-up enables capture of messages relating to interoffice calls that the network 31 fails to complete to the ISP. On any call that does not complete, one of the offices will send an REL message and receive an PCL message. In all cases, whether completed or not, the REL message includes a cause code identifying the reason for the release.

Consider again a call for Internet access from a user of the PC $7_A$ to the ISP equipment $7_B$. As in the first example, the user activates the PC $7_A$ to initiate dialing of the main number of the hunt group connected from end office 13 to the ISP equipment $7_B$. The SP end office 11 again checks trunk availability and generates an IAM message and sends that message through either the STP 21 or the STP 23 to the end office 13. In this example, however, assume that the end office 13 determines that the call can not be completed.

Typically, in response to the IAM message, the end office 13 determines whether or not one of the lines in the hunt group corresponding to the dialed number is available. If all lines are engaged at this time, no line is available. The end office 13 generates an REL message containing a normal event cause code indicating a "user busy" condition (0010001-17). The end office 13 sends this REL message back by simply reversing the origination and destination point codes from the IAM message and sending the message over an A link to one of the STPs 21, 23. Again, the STP receiving the message examines the addresses and uses its translations, and now it forwards the REL message over another link to the appropriate destination, in this case to the end office 11. The end office 11 provides a slow busy tone over the line to the calling equipment $7_A$, indicating that the dialed destination is busy. When the calling equipment disconnects following the busy signal, the end office 11 sends back an RCL message indicating that the circuit has returned to the idle state. In this example, the monitors 31 and card cages 33 capture the IAM, EEL and ECL from the A links. The site processor 35 compiles a CDP for the uncompleted call from this set of messages.

For a study that includes overflow interoffice traffic through the tandem 17, the card cages 33 are set so that the monitors 31 capture A-link signaling messages going to and from the tandem 17. The call processing is similar to that described above for the calls routed directly between the end offices, except that there is separate signaling associated with each leg of the call to and from the tandem 17. Specifically, the end office 11 and the tandem exchange appropriate messages to set up and release a first leg of the call up to the tandem 17. The tandem 17 and the end office 13 exchange appropriate messages to set up and release a second leg of the call up from the tandem 17 to the end office 13. For the exemplary study, the site processor 35 compiles a CDR from the complete set of SS7 messages relating to each of the calls from the message monitored on the A links connected to the tandem 17.

For example, if the end office 11 does not have an available trunk to the end office 13, the end office 11 initiates procedures for overflow processing of the call through the tandem 17. During processing of the call through the tandem, if there is no trunk circuit available from the tandem 17 to the end office 13, the tandem returns an REL message to the originating end office 11. Here, the REL message includes a cause code indicating "no circuit available" (0100010-34) to the end office 11. The end office 11 provides a fast busy tone over the line to the calling equipment $7_A$, indicating a network busy condition. When the calling equipment disconnects following the busy signal, the end office 11 sends an RCL message back to the tandem 17 indicating that the circuit has returned to the idle state. Again, the monitoring system captures the IAM, REL and RCL and uses data from those messages to compile a CDR for the uncompleted call.

The monitoring of the SS7 interoffice signaling messages on the A links connected to the end offices 11, 13 and tandem 17 can capture all of the signaling involved in the above described examples of completed and uncompleted calls to the ISP $7_B$. The captured messages include the REL messages for each of these calls. As noted earlier, the captured EEL messages include release cause codes indicating the reason or cause for the release of each call. In our examples, one code indicated normal clearing after disconnect, one code indicated user busy, and one code indicated no circuit available out of the tandem. The EEL messages include OPC and DPC addresses identifying the sending and receiving offices involved in each message. At least one of the other messages relating to the call, such as the IAM, provides calling and called party numbers. CDs compiled from such message sets therefore identify the calling and called parties, the outcome of processing of the call (completed or not), the cause of the release, and the various offices involved in processing of each of the calls.

Calls crossing the interface between the LEC network $3_1$ and the CLEC network $3_2$ go through the tandems 17 and 19. Typically, this requires a leg through the originating office to the tandem of the originating carrier, a leg between the tandems and a leg from the tandem of the terminating carrier through an end office of that carrier to the destination station.

For example, if the user at PC $7_A$ now calls the ISP $7_c$, the first leg of the call extends to the tandem 17. The second leg extends between the tandems 17 and 19, and the final leg extends from the CLEC tandem 19 through the end office 15. Calls to and from other carriers' networks that use the LEC network $3_1$ to access the CLEC network $3_2$ would include similar legs, particularly the leg between the tandems 17, 19. Each leg of any such call entails interoffice signaling similar to that discussed in our earlier examples of a simple intra-carrier call between $7_A$ and $7_B$. In particular, the message sets for signaling regarding such interconnect calls between carriers will include REL messages containing the release cause codes.

To monitor interconnect traffic between the carriers, it would be possible to capture A link signaling messages of the end offices. However, it is preferred to capture B and D link signaling messages on the leg of the call between the tandems, i.e. across the actual interface between the two carriers' networks.

For this purpose, the LEC can configure remotely on the B and D links from the LEC's STP pair 21, 23 to the STP pair 25, 27 serving the CLEC. Specifically, the study management application running in the OLAP 80 (FIG. 1) remotely accesses the site processor 35 to configure on the B and D links and specify a study period for collecting all the records on those links. Depending on the intent of the study, the management application may instruct the site processor to capture messages relating either to calls originating in the LEC network, calls terminating in the LEC network or both.

The CDRs developed from the monitoring of SS7 messages include a substantial number of significant pieces of information. For purposes of the present invention, one particularly relevant piece of information is the "release cause code," which indicates the reason for a call termination. Of particular interest, these codes indicate the causes when calls are not completed as dialed. Examples include user busy, no circuit available, etc. The CDRs capture these codes from the SS7 messages, and as discussed in detailed above, the traffic track analysis of the present invention can provide a variety of analytical tools and reports, using the release cause codes.

The study of blockages using the release codes from the CDPs presents a number of applications. For network engineering purposes, the information regarding the types and locations of blockages enables decisions as to when and where to deploy new equipment, such as direct end offices trunks, tandems, advanced peripheral switch modules, etc. The blockage data may be useful in marketing, for example, to show a customer the cause of his blockage problems and how a more advanced service from the LEC might overcome those problems. The blockage problems might also be useful in addressing complaints by customers, such as the CLEC $3_2$ or the ISP $7_B$.

It may be helpful, at this point, to consider a few representative examples of analysis of troubles from the release cause codes.

As a first example, if there is a mass call-in to a station $7_A$, e.g. because of a radio station promotion or the like, the analysis system can indicate how many callers got through and how many did not. For those that did not get through, the system can identify by major categories or specific causes the reasons that the uncompleted calls did not go through, for example the number of calls released because the destination station (user) $7_A$ was busy, the number of calls released because no trunks were available, etc.

If the study collects data relating to signaling messages going to and from the tandem 17, in our mass call-in example, a "no circuit available" code indicates that there was no trunk available out of that tandem 17. Interoffice calls would route to the tandem only if the direct trunks to the end office 11, e.g. from the office 13, were already full. The count of calls resulting in a cause code of "no circuit available" indicates the degree to which the LEC network was overloaded by the mass call-in.

As another example, consider a study of interconnect traffic transiting the interface between the LEC network $3_1$ and the CLEC network $3_2$. For such a study, the monitors 31, card cages 33 and site processor(s) 35 are set-up to capture interoffice signaling messages on the B and D links between the STP pair 21, 23 and the STP pair 25, 27. The CDP data collected on such a study may relate to all traffic, all terminating traffic to the CLEC, or all originating traffic from the CLEC, passing between the tandems 17 and 19.

If the CLEC complains of blockages, it is possible to analyze the CDR data files from such a transit interconnect study to determine the reasons for specific blockages. As noted in the previous example, a "no circuit available" code would indicate that there was no trunk available out of the tandem 17 at the time of a call release. A substantial number of calls with this type of release indicates a need for more trunk circuits between the tandems 17, 19. However, if there are no circuits available at some point in the CLEC network $3_2$ for terminating traffic, it shows up as a different release cause code in the CDRs, typically as a default "resource unavailable" code. If the analysis shows a large number of uncompleted calls with this release cause code, the LEC might respond to the CLEC complaints by showing study results depicting the number of blockages caused by problems of inadequate service provided by the elements 15, 17 of the CLEC network $3_2$. If location codes are available in the CDRs, the location codes would also help to distinguish blockage locations between the LEC and CLEC networks.

As another example, consider the situation if the ISP 7B complains of poor service. The LEC 31 might study the blockages to all of the numbers for that ISP. Under some circumstances, the LEC might counter the ISP's complaint by showing that many of the blockages are a result of the ISP having too few modems and lines associated with calls for the identified number(s), as represented by a high number of calls released due to a "user busy."

As an example of use for marketing, it is possible to drill down into the relevant SS7 CDPs to identify calls from specific users calling to the ISP numbers and identify the blockage patterns encountered by those customers. For example, if a customer is encountering numerous blockages on calls to her ISP, the study might analyze the causes, to enable the LEC to market new technologies to that user, which overcome the blockage problems. In fact, the study might identify users of a particular type, say high-end Internet users by their calling pattern. The study might then identify those users suffering from certain types of blockages. The LEC's marketing department could then show such users the number of blockages of each relevant type they suffered and how bypass through digital subscriber line service or the like would eliminate blockages due to user busy conditions and due to lack of available trunk resources.

Those skilled in the art will recognize that the invention admits of a wide range of modifications, all of which fall within the spirit and scope of the inventive concepts. Several examples are discussed briefly below.

The traffic track technology described in detail above has applied to analysis of the actual call traffic through the PSTN. However, the technology may be applied as desired to analysis of traffic through other types of telecommunication networks, such as cell or packet data networks, cellular networks, etc.

As described above, the SS7 monitoring traps messages from identified links going to and from the STPs. Other forms of monitoring of the interoffice signaling fall within the scope of the invention. For example, the function of the site processors might be rolled up into processor functions on the card cages. Also, a number of STP vendors have products that can supply message copies to monitoring ports, such that the STP itself performs the monitor or trapping function.

From the foregoing it may be seen that the system and methodology of the invention provide a powerful and flexible tool for performing varying investigations and surveillance of network traffic to identify and analyze blockages and other network troubles. Thus, as examples, it is feasible to identify common types of blockages, determine the points suffering the blockages and/or the types of traffic suffering the blockages, and the optimal solution.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method comprising the steps of:
    capturing a plurality of management data messages generated by a telecommunication network during processing of each of a plurality of calls through the telecommunication network, wherein at least one of the management data messages generated during the processing of each of the calls specifies a release cause;
    compiling a detailed record of each of the calls from the captured management data messages, each record including a specified release cause; and
    processing the specified release causes in the detailed records, to form aggregate data, wherein said processing step comprises identifying the detailed records having release causes that are indicative of troubles encountered in processing call traffic through the telecommunication network, and segregating the identified detailed records by release cause to distinguish trouble call traffic patterns.

2. A method as in claim 1, wherein the step of capturing comprises trapping signaling messages exchanged between offices of the telecommunication network.

3. A method as in claim 2, wherein the signaling messages comprise common channel interoffice signaling messages.

4. A method as in claim 2, wherein one of the offices of the telecommunication network comprises an office of a first carrier's network and another of the offices comprises an office of a second carrier's network.

5. A method as in claim 4, wherein the first carrier's network comprises a local exchange carrier's network.

6. A method as in claim 1, wherein the step of processing further comprises:
    loading the detailed records into a table in a database; and
    processing the detailed records in the database table to form the aggregate data.

7. A method comprising the steps of:
    capturing a plurality of management data messages generated by a telecommunication network during processing of each of a plurality of calls through the telecommunication network, wherein at least one of the management data messages generated during the processing of each of the calls specifies a release cause;

compiling a detailed record of each of the calls from the captured management data messages, each record including a specified release cause; and processing the specified release causes in the detailed records to form aggregate data indicative of troubles encountered in processing of patterns of call traffic through the telecommunication network; wherein the step of processing comprises:

loading the detailed records into a table in a database; and processing the detailed records in the database table to form the aggregate data; and wherein the step of processing the detailed records in the database table to form the aggregate data comprises:

enhancing the detail records in the database table;

loading the enhanced detail records into an on-line analytical processing system; and running a pre-defined study application in the on-line analytical processing system to present specified analytical study results based on the enhanced detail records.

8. A method as in claim 7, wherein the step of enhancing comprises translating at least one item of information from the detail records in the database table into descriptive information using external reference data.

9. A method as in claim 8, wherein:

the at least one item of information comprises a code representing the specified release cause, and the descriptive information identifies a release cause corresponding to the code.

10. A method as in claim 8, wherein the step of enhancing comprises spreading usage data contained in the detail records in the database table of calls extending over a plurality of predetermined intervals into bins associated with the predetermined intervals.

11. A method as in claim 8, wherein the step of enhancing comprises compiling a predefined summary table from data in the detail records in the database table.

12. A method as in claim 8, wherein:

the database comprises a relational database; and the on-line analytical processing system comprises a multi-dimensional database.

13. A method comprising the steps of:

capturing a plurality of management data messages generated by a telecommunication network during processing of each of a plurality of calls through the telecommunication network, wherein at least one of the management data messages generated during processing of each call specifies a release cause and a location of the release cause;

compiling a detailed record of each of the calls from the captured management data messages, each record including a specified release cause and the location of the specified release cause; and processing the specified release causes and locations in the detailed records, to form aggregate data, wherein said processing step comprises identifying the detailed records having release causes that are indicative of troubles encountered in processing call traffic through the telecommunication network and the locations of release causes, and segregating the identified detailed records by release cause to distinguish trouble call traffic patterns.

14. A method as in claim 13, where in the at least one of the management data messages generated during processing of each call comprises a location code specify ing a location relevant to the release cause.

15. A method as in claim 14, wherein the location code comprises a signaling point code of an office of the telecommunication network involved in call processing.

16. A method as in claim 14, wherein the location code comprises at least a portion of a telephone number associated with a party to a call processed by the telecommunication network.

17. A method as in claim 14, wherein the location code comprises a release cause location code specified by a protocol for interoffice signaling used in the telecommunication network.

18. A method as in claim 14, further comprising the step of translating the location code into descriptive information identifying location in the telecommunication network.

19. A method as in claim 1, wherein the telecommunication network comprises at least a portion of the public switching telephone network.

20. A system comprising:

a monitoring system, for association with a switched telecommunication network, for monitoring management data messages communicated during processing of calls by the switched telecommunication network, wherein at least one of the management data messages generated during the processing of each of the calls specifics a release cause;

a processor for compiling detailed records of processed calls from the monitored messages;

a database for storing the detailed records in a table; and an on-line processing system for aggregating data from the database table, said on-line processing system comprising a structure for identifying the detailed records having release causes that are indicative of troubles encountered in processing call traffic through the telecommunication network, and segregating the identified detailed records by release cause to distinguish trouble call traffic patterns.

21. A system as in claim 20, wherein:

the database comprises a relational database; and the on-line processing system comprises a multi-dimensional database.

22. A system as in claim 21, wherein:

the on-line processing system further comprises a study application running on the multi-dimensional database, for aggregating data indicative of a predetermined characteristic of the call traffic processed in the telecommunication network; and the study application facilitates presentation of statistics regarding the troubles based on the specified release causes.

23. A system as in claim 20, wherein the monitoring system comprises monitors coupled to interoffice signaling links between telephone switching offices of the network.

24. A system as in claim 23, wherein the monitor capture signaling system 7 protocol messages.

25. A method of analyzing troubles encountered by call traffic processed through a telephone network, the method comprising:

monitoring interoffice signaling messages communicated between offices of the telephone network during processing of each of a plurality of calls through the offices, wherein at least one of the messages communicated during the processing of each of the calls comprises a release cause code;

compiling detailed records for a predetermined set of calls processed through the telephone network from the monitored messages, each of a plurality of the detailed records including a release cause code specifying a reason that the telephone network did not complete a call;

translating the release cause codes into corresponding descriptions of release causes to form a plurality of enhanced detailed records; and processing the release cause codes in the plurality of enhanced detailed records, to form aggregate data indicative of troubles preventing the telephone network from completing calls.

26. A method of analyzing troubles encountered by call traffic processed through a telephone network, the method comprising:

monitoring interoffice signaling messages communicated between offices of the telephone network during processing of each of a plurality of calls through the offices, wherein at least one of the messages communicated during the processing of each of the calls comprises a release cause code; compiling detailed records for a predetermined set of calls processed through the telephone network from the monitored messages, each of a plurality of the detailed records including a release cause code specifying a reason that the telephone network did not complete a call;

processing the release cause codes in the plurality of detailed records, to form aggregate data indicative of troubles preventing the telephone network from completing calls; and translating at least one item of information in each of the plurality of call detail records into an identifier of a telephone switching office generating a release code.

* * * * *